(12) United States Patent
Peng et al.

(10) Patent No.: US 12,256,365 B2
(45) Date of Patent: Mar. 18, 2025

(54) COMMUNICATION METHOD AND APPARATUS

(71) Applicant: Huawei Technologies Co., Ltd., Shenzhen (CN)

(72) Inventors: Wenjie Peng, Shanghai (CN); Mingzeng Dai, Shenzhen (CN); Rui Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 437 days.

(21) Appl. No.: 17/729,887

(22) Filed: Apr. 26, 2022

(65) Prior Publication Data

US 2022/0256501 A1 Aug. 11, 2022

Related U.S. Application Data

(63) Continuation of application No. PCT/CN2019/113497, filed on Oct. 26, 2019.

(51) Int. Cl.
*H04W 68/02* (2009.01)
*H04W 88/06* (2009.01)

(52) U.S. Cl.
CPC ............ *H04W 68/02* (2013.01); *H04W 88/06* (2013.01)

(58) Field of Classification Search
CPC .................................................... H04W 68/02
USPC .......................................................... 455/458
See application file for complete search history.

(56) References Cited

U.S. PATENT DOCUMENTS

| | | | |
|---|---|---|---|
| 2013/0267261 A1 | 10/2013 | Nikkelen | |
| 2014/0274047 A1 | 9/2014 | Dhanda et al. | |
| 2016/0021660 A1 | 1/2016 | Krishnamurthy | |
| 2017/0325278 A1* | 11/2017 | Ramkumar | ........... H04W 8/082 |

FOREIGN PATENT DOCUMENTS

| | | | | |
|---|---|---|---|---|
| CN | 101141732 A | | 3/2008 | |
| CN | 106465464 A | * | 2/2017 | ............ H04W 36/08 |
| WO | 2018121920 A1 | | 7/2018 | |
| WO | 2018194353 A1 | | 10/2018 | |

OTHER PUBLICATIONS

CN106465464 Englisg Translation (Year: 2017).*
(Continued)

*Primary Examiner* — Ted M Wang
(74) *Attorney, Agent, or Firm* — Leydig, Voit & Mayer, Ltd.

(57) ABSTRACT

A communication method includes: a terminal device sends, to a network side device, information indicating that a first user identity of the terminal device and a second user identity of the terminal device are associated with the terminal device; and the terminal device receives, by using the first user identity, paging information corresponding to the second user identity of the terminal device. In the method, the terminal device receives a paging-related message or paging-related information in a cell corresponding to a single user identity, to monitor paging information of a plurality of user identities of the terminal device, so that the plurality of user identities of the terminal device can be effectively paged.

18 Claims, 6 Drawing Sheets

(56) References Cited

OTHER PUBLICATIONS

"New SID: Study on system enablers for multi-SIM devices," TSG SA Meeting #SP-82, Sorrento, Italy, SP-181251 (was SP-181235, S2-1813349), Total 4 pages, 3rd Generation Partnership Project, Valbonne, France (Dec. 12-14, 2018).
"New Rel-17 SID proposal: Study on multi-SIM devices in RAN," 3GPP TSG RAN Meeting #84, Newport Beach, USA, RP-191303, Total 4 pages, 3rd Generation Partnership Project, Valbonne, France (Jun. 3-6, 2019).

* cited by examiner

COMMUNICATION METHOD AND APPARATUS

CROSS-REFERENCE TO RELATED APPLICATIONS

This application is a continuation of International Application No. PCT/CN2019/113497, filed on Oct. 26, 2019, the disclosure of which is incorporated herein by reference in its entirety.

TECHNICAL FIELD

This application relates to the field of communication technologies, and in particular, to a communication method and apparatus.

BACKGROUND

A dual subscriber identity module (SIM) mobile phone can support two subscriber identity module cards, and the two cards may be of a same operator, or may be of different operators. There may be two types of dual SIM mobile phones: dual SIM dual standby (DSDS) mobile phones and dual SIM dual active (DSDA) mobile phones.

Two SIM cards in the DSDS mobile phone share one transceiver, and the two SIM cards (for example, a SIM A and a SIM B) work in a time division multiplexing (TDM) mode. That is, when one SIM card is in a connected state, the other SIM card is unavailable. If paging occasions of the SIM A and the SIM B overlap, there is a paging conflict between the SIM A and the SIM B. Therefore, how to effectively implement paging of the DSDS mobile phone becomes an urgent problem to be resolved.

SUMMARY

Embodiments of this application provide a communication method and apparatus, to resolve a paging conflict problem in a mobile phone that supports dual SIM cards or more SIM cards.

According to a first aspect, an embodiment of this application provides a communication method. The method may be performed by a terminal device or a component (for example, a processor, a chip, or a chip system) of the terminal device. The method includes: sending, to a network side device, information indicating that a first user identity of the terminal device and a second user identity of the terminal device are associated with the terminal device; and receiving, by using the first user identity, paging information corresponding to the second user identity of the terminal device.

In the foregoing method, the terminal device receives a paging message or paging information in a cell corresponding to a single user identity, to monitor the first user identity and the second user identity, so that a user identity of the terminal device can be effectively paged.

In some possible implementations, the terminal device sends first information to a first network side device, where the first information includes identification information of the terminal device corresponding to the second user identity, and the first network side device provides a service for the first user identity of the terminal device.

In the foregoing implementations, the first network side device can determine, based on the first information, that the first user identity and the second user identity are associated with the terminal device, so that the first network side device and a second network side device can complete association between the first user identity and the second user identity.

Optionally, the first information may further include identification information of the terminal device corresponding to the first user identity.

Optionally, the terminal device sends second information to the second network side device, where the second information includes the identification information of the terminal device corresponding to the first user identity, and the second network side device provides a service for the second user identity of the terminal device.

Optionally, the second information may further include the identification information of the terminal device corresponding to the second user identity.

In some possible implementations, the terminal device may send monitoring indication information to the second network side device, to indicate a user identity used by the terminal device to monitor the paging information, that is, the monitoring indication information indicates that the terminal device receives the paging information in a cell corresponding to the first user identity. The terminal device is in a connected state by using the first user identity and is in an idle state or an inactive state by using the second user identity, or the terminal device is in an idle state or an inactive state by using the first user identity and is in the idle state or the inactive state by using the second user identity.

In the foregoing implementations, the second network side device can determine a user identity or a SIM card used by the terminal device to monitor the paging information. Therefore, the second network side device can effectively page the second user identity. This prevents the second user identity from receiving the paging message.

With reference to the first aspect, in some implementations of the first aspect, when the terminal device is in the connected state by using the first user identity, the terminal device receives a radio resource control (RRC) message from a first access network device, so that the terminal device can receive, by using the first user identity, the paging information corresponding to the second user identity of the terminal device. The RRC message is a message sent to the first user identity of the terminal device, and the RRC message includes the paging information. Optionally, the RRC message may include the identification information of the terminal device corresponding to the second user identity, or include the identification information of the terminal device corresponding to the first user identity and the identification information of the terminal device corresponding to the second user identity.

With reference to the first aspect, in some implementations of the first aspect, the terminal device may receive the paging message from the network side device by using the first user identity, where the paging message indicates that the second user identity of the terminal device is to be paged, the paging message includes the paging information, and the terminal device is in the idle state or the inactive state by using the first user identity and is in the idle state or the inactive state by using the second user identity.

For example, the terminal device receives a first paging message from the first access network device, where the first paging message includes the paging information, the paging information is used to indicate that the second user identity of the terminal device is to be paged, the terminal device is in the idle state by using the first user identity and is in the idle state by using the second user identity, and the first access network device provides a service for the first user identity of the terminal device. The first paging message is a paging message initiated by a core network device.

Optionally, the first paging message may include the identification information of the terminal device corresponding to the second user identity, or include the identification information of the terminal device corresponding to the first user identity and the identification information of the terminal device corresponding to the second user identity.

Alternatively, for another example, the terminal device receives a radio access network paging message from the first access network device, where the radio access network paging message indicates that the second user identity is to be paged, and the terminal device is in the inactive state by using the first user identity and is in the inactive state by using the second user identity. Optionally, the radio access network paging message may include the identification information of the terminal device corresponding to the second user identity, or include the identification information of the terminal device corresponding to the first user identity and the identification information of the terminal device corresponding to the second user identity:

Alternatively, for still another example, the terminal device receives a second paging message from the first access network device, where the second paging message includes the paging information, the paging information is used to indicate that the second user identity of the terminal device is to be paged, the terminal device is in the inactive state by using the first user identity and is in the idle state by using the second user identity, and the first access network device provides a service for the first user identity of the terminal device. The first paging message is a paging message initiated by an access network device. Optionally, the second paging message may include the identification information of the terminal device corresponding to the second user identity, or include the identification information of the terminal device corresponding to the first user identity and the identification information of the terminal device corresponding to the second user identity.

Alternatively, for yet another example, the terminal device receives a radio access network paging message from the first access network device, where the radio access network paging message is a message sent to the first user identity of the terminal device, the radio access network paging message indicates that the second user identity of the terminal device is to be paged, and the terminal device is in the inactive state by using the first user identity and is in the idle state by using the second user identity.

Optionally, the terminal device attempts, based on the paging information, to enter the connected state by using the second user identity.

In the foregoing method, the terminal device receives the paging-related message or paging-related information in the cell corresponding to the single user identity, to monitor the paging information of the first user identity and the second user identity of the terminal device, so that a user identity of the terminal device can be effectively paged.

According to a second aspect, an embodiment of this application provides a communication method. The method may be performed by a first network side device or a component (for example, a processor, a chip, or a chip system) of the first network side device. The method includes: receiving information indicating that a first user identity of a terminal device and a second user identity of the terminal device are associated with the terminal device, where the first network side device provides a service for the first user identity of the terminal device:

sending, to a second network side device, the information indicating that the first user identity of the terminal device and the second user identity of the terminal device are associated with the terminal device, where the second network side device provides a service for the second user identity of the terminal device;

receiving paging indication information from the second network side device, where the paging indication information indicates that the second user identity of the terminal device is to be paged; and sending a first message to the terminal device, to indicate that the second user identity of the terminal device is to be paged.

In the foregoing method, the first network side device and the second network side device complete association between the first user identity of the terminal device, the second user identity of the terminal device, and the terminal device, and the second network side device pages the second user identity of the terminal device through the first network side device, so that a user identity of the terminal device can be effectively paged.

Optionally, the first network side device may receive first information from the terminal device, to determine that the first user identity and the second user identity are associated with the terminal device. That is, the first information includes identification information of the terminal device corresponding to the second user identity. Optionally, the first information further includes identification information of the terminal device corresponding to the first user identity.

Optionally, the first network side device receives, from the second network side device, information indicating that the association between the first user identity and the second user identity is completed. Optionally, the step of receiving the information indicating that the association is completed is not necessary: To be specific, when receiving the information indicating that the first user identity of the terminal device and the second user identity of the terminal device are associated with the terminal device, the second network side device can determine that the association is completed.

With reference to the second aspect, in some implementations of the second aspect, the first network side device may send the first message to a first access network device, to indicate that the second user identity of the terminal device is to be paged. The first message may indicate the first access network device to send a radio resource control RRC message to the terminal device, where the RRC message indicates that the second user identity of the terminal device is to be paged, the terminal device is in a connected state by using the first user identity, and the terminal device is in an idle state by using the second user identity.

With reference to the second aspect, in some implementations of the second aspect, the first network side device may send the first message to a first access network device, to indicate that the second user identity of the terminal device is to be paged. The first message may indicate the first access network device to send a first paging message to the terminal device, where the first paging message indicates that the second user identity of the terminal device is to be paged, the terminal device is in an idle state by using the first user identity, and the terminal device is in the idle state by using the second user identity.

With reference to the second aspect, in some implementations of the second aspect, the first network side device may send an RRC message to the terminal device, to indicate that the second user identity of the terminal device is to be paged, where the RRC message is a message sent to the first user identity of the terminal device, the RRC message indicates that the second user identity of the terminal device is to be paged, the terminal device is in a connected state by using the first user identity, and the terminal device is in an inactive state by using the second user identity.

With reference to the second aspect, in some implementations of the second aspect, the first network side device may send a radio access network paging message to the terminal device, to indicate that the second user identity of the terminal device is to be paged, where the radio access network paging message is a message sent to the first user identity of the terminal device, the radio access network paging message indicates that the second user identity of the terminal device is to be paged, the terminal device is in an inactive state by using the first user identity, and the terminal device is in the inactive state by using the second user identity.

In some possible implementations, the first network side device may send connected-state indication information to the second network side device, to indicate that the terminal device is in the connected state by using the first user identity. That is, the connected-state indication information indicates that the terminal device is in the connected state by using the first user identity.

In the foregoing implementations, the connected-state indication information is used to notify the second network side device to page the second user identity of the terminal device through the first network side device.

In the foregoing method, the terminal device receives a paging-related message or paging-related information in a cell corresponding to a single user identity, to monitor paging information of the first user identity and the second user identity of the terminal device. After receiving the paging indication information from the second network side device, the first network side device sends the paging information to the terminal device, to page the second user identity, so that a user identity of the terminal device can be effectively paged.

According to a third aspect, an embodiment of this application provides a communication method. The method may be performed by a second network side device or a component (for example, a processor, a chip, or a chip system) of the second network side device. The method includes: determining that a first user identity of a terminal device is associated with a second user identity, and determining to page the second user identity of the terminal device through a first network side device, where the first network side device provides a service for the first user identity of the terminal device, and the second network side device provides a service for the second user identity of the terminal device; and sending paging indication information to the first network side device, where the paging indication information indicates that the second user identity is to be paged.

In the foregoing method, the second network side device can page the second user identity of the terminal device through the first network side device, so that the second user identity can be effectively paged.

In some possible implementations, the second network side device may receive second information from the terminal device, to determine that the first user identity and the second user identity are associated with the terminal device. That is, the second information includes identification information of the terminal device corresponding to the first user identity. Optionally, the second information may further include identification information of the terminal device corresponding to the second user identity.

Optionally, the second network side device receives, from the first network side device, information indicating that the first user identity of the terminal device and the second user identity of the terminal device are associated with the terminal device.

Optionally, the second network side device sends, to the first network side device, information indicating that association between the first user identity and the second user identity is completed.

In the foregoing implementations, the second network side device and the first network side device complete the association between the first user identity of the terminal device and the second user identity of the terminal device.

In some possible implementations, the second network side device receives monitoring indication information from the terminal device, where the monitoring indication information indicates that the terminal device receives paging information in a cell corresponding to the first user identity.

In the foregoing implementations, the second network side device may determine that the terminal device monitors the paging information by using the first user identity (or by using a first SIM card), to effectively page the second user identity.

In some possible implementations, the second network side device receives connected-state indication information from the first network side device, where the connected-state indication information indicates that the first user identity is in a connected state.

In the foregoing implementations, the second network side device can determine that the first network side device is in the connected state, that is, determine that the second network side device pages the second user identity of the terminal device through the first network side device.

In the foregoing method, the terminal device receives a paging-related message or paging-related information in a cell corresponding to a single user identity, to monitor the paging information of the first user identity and the second user identity of the terminal device. When the second network side device needs to page the second user identity, the second network side device sends the paging indication information to the first network side device, where the paging indication information is used to indicate that the second user identity is to be paged. The method helps effectively page a user identity of the terminal device.

According to a fourth aspect, an embodiment of this application provides an apparatus, to implement the method according to any one of the first aspect or the possible implementations of the first aspect. The apparatus includes a corresponding unit or component configured to perform the foregoing method. The unit included in the apparatus may be implemented by using software and/or hardware. The apparatus may be, for example, a terminal device, or a chip, a chip system, or a processor that can support the terminal device in implementing the foregoing method.

According to a fifth aspect, an embodiment of this application provides an apparatus, to implement the method according to any one of the second aspect or the possible implementations of the second aspect. The apparatus includes a corresponding unit or component configured to perform the foregoing method. The unit included in the apparatus may be implemented by using software and/or hardware. The apparatus may be, for example, a first network side device, or a chip, a chip system, or a processor that can support the first network side device in implementing the foregoing method.

According to a sixth aspect, an embodiment of this application provides an apparatus, to implement the method according to any one of the third aspect or the possible implementations of the third aspect. The apparatus includes a corresponding unit or component configured to perform the foregoing method. The unit included in the apparatus may be implemented by using software and/or hardware. The apparatus may be, for example, a second network side device, or a chip, a chip system, or a processor that can support the second network side device in implementing the foregoing method.

According to a seventh aspect, an embodiment of this application provides an apparatus. The apparatus includes a processor, where the processor is coupled to a memory, and the memory is configured to store a program or instructions. When the program or the instructions are executed by the processor, the apparatus is enabled to implement the method according to any one of the first aspect or the possible implementations of the first aspect.

According to an eighth aspect, an embodiment of this application provides an apparatus. The apparatus includes a processor, where the processor is coupled to a memory, and the memory is configured to store a program or instructions. When the program or the instructions are executed by the processor, the apparatus is enabled to implement the method according to any one of the second aspect or the possible implementations of the second aspect.

According to a ninth aspect, an embodiment of this application provides an apparatus. The apparatus includes a processor, where the processor is coupled to a memory, and the memory is configured to store a program or instructions. When the program or the instructions are executed by the processor, the apparatus is enabled to implement the method according to any one of the third aspect or the possible implementations of the third aspect.

According to a tenth aspect, an embodiment of this application provides a computer-readable storage medium. The computer-readable storage medium stores a computer program or instructions. When the computer program or the instructions are executed, a computer is enabled to perform the method according to any one of the first aspect, the second aspect, the third aspect, the possible implementations of the first aspect, the possible implementations of the second aspect, or the possible implementations of the third aspect.

According to an eleventh aspect, an embodiment of this application provides a computer program product. The computer program product includes computer program code. When the computer program code is run on a computer, the computer is enabled to perform the method according to any one of the first aspect, the second aspect, the third aspect, the possible implementations of the first aspect, the possible implementations of the second aspect, or the possible implementations of the third aspect.

According to a twelfth aspect, an embodiment of this application provides a chip. The chip includes a processor, where the processor is coupled to a memory, and the memory is configured to store a program or instructions. When the program or the instructions are executed by the processor, the chip is enabled to implement the method according to any one of the first aspect, the second aspect, the third aspect, the possible implementations of the first aspect, the possible implementations of the second aspect, or the possible implementations of the third aspect.

According to a thirteenth aspect, an embodiment of this application provides a communication system. The system includes the apparatus according to the fourth aspect and the apparatus according to the fifth aspect. Optionally, the communication system may further include the apparatus according to the sixth aspect.

According to a fourteenth aspect, an embodiment of this application provides a communication system. The system includes the apparatus according to the fifth aspect and the apparatus according to the sixth aspect. Optionally, the system may further include the apparatus according to the fourth aspect.

DESCRIPTION OF EMBODIMENTS

First, a communication system to which technical solutions provided in this application are applicable is described.

The technical solutions in embodiments of this application may be applied to various communication systems, for example, a long term evolution (LTE) system, a 5th generation (5G) communication system, a wireless fidelity (Wi-Fi) system, a system obtained by integrating a plurality of communication systems, a future evolved communication system, or another network system that may be used to provide a communication service. This is not limited herein.

Figure 1:
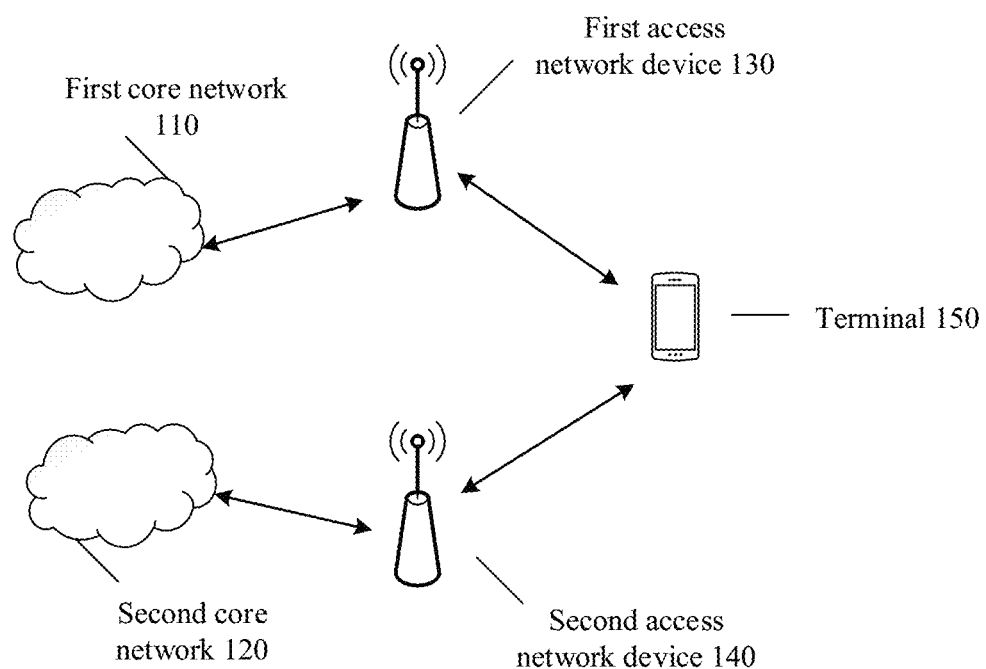
FIG. 1 is a schematic diagram of a communication system to which an embodiment of this application is applied.

FIG. 1 shows an example of a schematic diagram of a structure of a possible communication system. The communication system includes at least one core network device (where a first core network device 110 and a second core network device 120 are shown in the figure), one or more access network devices connected to the core network device (where a first access network device 130 and a second access network device 140 are shown in the figure), and a terminal device 150 connected to the access network devices. The terminal device 150 shown in FIG. 1 is a DSDS terminal device, and the terminal device may support two SIM cards.

Figure 2:
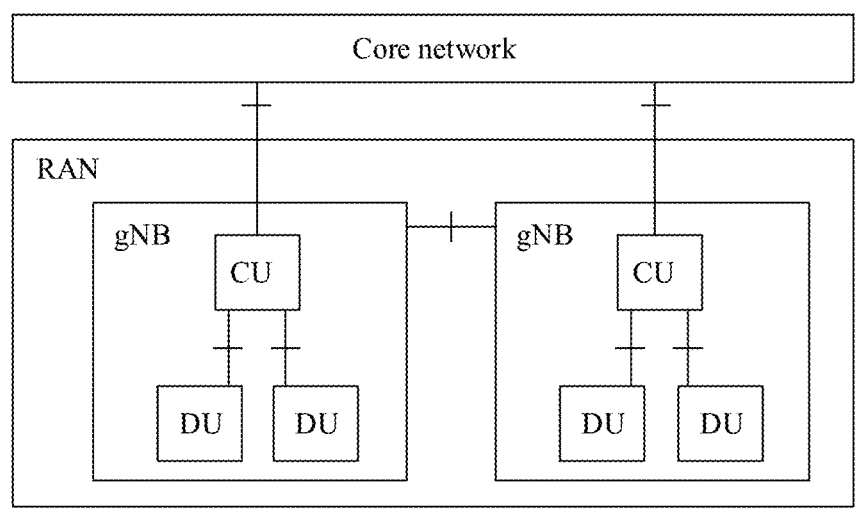
FIG. 2 is a schematic diagram of an example of an architecture of a communication system.

FIG. 2 is a schematic diagram of an example of a possible architecture of a communication system. As shown in FIG. 2, a network device in a radio access network (RAN) is a base station (for example, a gNodeB or a gNB) with an architecture in which a centralized unit (CU) and a distributed unit (DU) are separated. The RAN may be connected to a core network (for example, an LTE core network or a 5G core network). It may be understood that the base station is divided into the CU and the DU from the perspective of a logical function. The CU and the DU may be physically separated or deployed together. A plurality of DUs may share one CU. One DU may alternatively be connected to a plurality of CUs. The CU and the DU may be connected through an interface, for example, an F1 interface.

Optionally, the CU and the DU may be obtained through division based on protocol layers of a wireless network. For example, functions of a radio resource control (RRC) layer, a service data adaptation protocol (SDAP) layer, and a packet data convergence protocol (PDCP) layer are deployed on the CU, and functions of a radio link control (RLC) layer, a media access control (MAC) layer, and a physical (PHY) layer are deployed on the DU. It should be understood that division of processing functions of the CU and the DU based on the protocol layers is merely an example, and the processing functions of the CU and the DU may alternatively be divided in another manner.

Optionally, the CU or the DU may alternatively have some processing functions of the protocol layers through division. In a possible design, some functions of the RLC layer and functions of a protocol layer above the RLC layer are deployed on the CU, and remaining functions of the RLC layer and functions of a protocol layer below the RLC layer are deployed on the DU. In another possible design, division of functions of the CU or the DU may be performed based on a service type or another system requirement. For example, division may be performed based on a latency. Functions whose processing time needs to satisfy a latency requirement are deployed on the DU, and functions whose processing time does not need to satisfy the latency requirement are deployed on the CU. A network architecture shown in FIG. 2 may be applied to a 5G communication system, and may alternatively share one or more components or resources with an LTE system. In another design, the CU may alternatively have one or more functions of a core network. One or more CUs may be disposed in a centralized manner or a separated manner. For example, the CUs may be disposed on a network side for ease of centralized management. The DU may have a plurality of radio frequency functions, or the radio frequency functions may be disposed remotely.

Optionally, functions of the CU may be implemented by one entity, or may be implemented by different entities. For example, the functions of the CU may be further divided. For example, a control plane (CP) is separated from a user plane (UP), that is, a CU control plane (CU-CP) is separated from a CU user plane (CU-UP). For example, the CU-CP and the CU-UP may be implemented by different function entities. The CU-CP and the CU-UP may be coupled to the DU to jointly implement functions of the base station. In a possible implementation, the CU-CP is responsible for control plane functions, and mainly includes an RRC and a PDCP-C. The PDCP-C is mainly responsible for data encryption and decryption, integrity protection, serial number maintenance, data transmission, and the like on the control plane. The CU-UP is responsible for user plane functions, and mainly includes an SDAP and a PDCP-U. The SDAP is mainly responsible for processing data of a core network and mapping a data flow to a bearer. The PDCP-U is mainly responsible for encryption and decryption, integrity protection, header compression, serial number maintenance, data transmission, and the like on a data plane. The CU-CP and the CU-UP are connected through an E1 interface.

It may be understood that embodiments provided in this application are also applicable to an architecture in which the CU and the DU are not separated.

In this application, an access network device may be any device having a wireless transceiver function. The access network device includes but is not limited to: an evolved NodeB (eNB or e-NodeB) in LTE, a base station (gNodeB or gNB) or a transmission reception point (transmission receiving point/transmission reception point. TRP) in new radio (NR), a base station that subsequently evolves in 3GPP, an access node in a Wi-Fi system, a wireless relay node, a wireless backhaul node, or the like. A base station may be a macro base station, a micro base station, a picocell base station, a small cell, a relay station, a balloon station, or the like. A plurality of base stations may support the aforementioned networks using a same technology, or may support the aforementioned networks using different technologies. The base station may include one or more co-site or non-co-site TRPs. The network side device may alternatively be a radio controller, a CU, and/or a DU in a cloud radio access network (CRAN) scenario. The network side device may alternatively be a server, a wearable device, a vehicle-mounted device, or the like. The plurality of network side devices may be base stations of a same type or base stations of different types. The base station may communicate with a terminal device, or may communicate with the terminal device via a relay station. The terminal device may communicate with a plurality of base stations using different technologies. For example, the terminal device may communicate with a base station supporting an LTE network, may communicate with a base station supporting a 5G network, or may support a dual connection to the base station supporting the LTE network and the base station supporting the 5G network.

The terminal device may be user equipment (UE), an access terminal, a subscriber unit, a subscriber station, a mobile station, a remote station, a remote terminal, a mobile device, a user terminal, a terminal, a wireless terminal device, a user agent, or a user apparatus. The terminal device may alternatively be a cellular phone, a cordless phone, a wireless local loop (WLL) station, a personal digital assistant (PDA) device, a handheld device having a wireless communication function, a computing device, another processing device connected to a wireless modem, a mobile phone, a tablet computer (Pad), a computer having a wireless transceiver function, a virtual reality (VR) terminal device, an augmented reality (AR) terminal device, a wireless terminal in industrial control, a vehicle-mounted terminal device, a wireless terminal in self-driving, a wireless terminal in telemedicine (remote medical), a wireless terminal in a smart grid, a wireless terminal in transportation safety, a wireless terminal in a smart city: a wireless terminal in a smart home, a wearable terminal device, a terminal device in a future 5G network, a terminal device in a future evolved PLMN, or the like. Alternatively, the terminal device may be fixed or mobile, and the terminal device may be deployed on land, on water, or in the air.

In addition, the terminal device in embodiments of this application may alternatively be a terminal device in an internet of things (IoT) system. IoT is an important part of future information technology development. A main technical feature of the IoT is connecting things to networks using communication technologies, to implement an intelligent network for interconnection between persons and machines, and between things. The terminal device in embodiments of this application may alternatively be a terminal device in machine type communication (MTC). The terminal device in this application may alternatively be a vehicle-mounted module, a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted module, the vehicle-mounted component, the vehicle-mounted chip, or the vehicle-mounted unit that is built in the vehicle, to implement a method in this application. Therefore, embodiments of this application may be applied to an internet of vehicles, for example, vehicle-to-everything (V2X), long term evolution-vehicle (LTE-V), and vehicle-to-vehicle (V2V).

It may be understood that an application scenario of the terminal device is not limited in embodiments of this application.

In a wireless communication network, the terminal device may be used in an application scenario in which a plurality of SIM cards are supported, and there may be a paging conflict between the plurality of SIM cards. For example, two SIM cards (for example, a SIM A and a SIM B) in a DSDS mobile phone share one transceiver. If paging occasions of the SIM A and the SIM B overlap, that is, calculated paging frames or paging occasions conflict, paging messages of the SIM A or the SIM B cannot be received in a timely manner. Therefore, how to effectively implement paging of the DSDS mobile phone becomes an urgent problem to be resolved. It may be understood that, in this application, an example in which a terminal device supports two SIM cards is used to describe the technical solutions provided in this application. The technical solutions are also applicable to a scenario in which the terminal device supports three, four, or even more SIM cards.

In a method provided in this application, at least one SIM card of the terminal device is in a non-connected state (where the non-connected state includes an idle state or an inactive state). The terminal device receives a paging-related message or paging-related information in a cell corresponding to a single SIM card (for example, a SIM A), to monitor paging to a plurality of SIM cards of the terminal device. For example, after a network side device A corresponding to the SIM A and a network side device B corresponding to a SIM B complete association, when the network side device B needs to page the SIM B, the network side device A sends paging information to a cell corresponding to the SIM A, to page the SIM B. Using this method can avoid frequent transceiver switching for the terminal device, and avoid a consequence that a paging message of a SIM card always fails to be received when paging occasions overlap. It is easy to understand that two SIM cards supported by the terminal device may be referred to as a first SIM card and a second SIM card in this application. This is not limited in this application.

It may be understood that the method provided in this application is also applicable to the scenario in which the terminal device supports three, four, or even more SIM cards. For example, the terminal device receives a paging-related message or paging-related information in a cell corresponding to a single SIM card (for example, a SIM A), to monitor paging to a plurality of SIM cards of the terminal device. After network side devices corresponding to the plurality of SIM cards complete association, when a network side device corresponding to another SIM card other than a network side device corresponding to the SIM A needs to page the another SIM card (for example, a SIM B, a SIM C, or a SIM D), the network side device corresponding to the SIM A sends a paging message to a cell corresponding to the SIM A, to page the another SIM card.

In a possible manner, the network side device may be a core network device (which may be referred to as a core network element or a core network node). Optionally, in an NR system, the core network device may be an access and mobility management function (AMF) entity, or a device including the AMF entity. Optionally, in an LTE system, the core network device may be a mobility management entity (MME), or a device including the MME entity. In another possible manner, the network side device may be an access network device, or may also be referred to as a base station. Optionally, the access network device may be an LTE evolved NodeB (eNB or e-NodeB) in a 4th generation (4G) communication system, and the access network device may be a gNodeB, a gNB, a transmission reception point (TRP), or the like in a 5G system.

The following describes technical solutions of this application in detail by using specific embodiments with reference to the accompanying drawings. The following embodiments and implementations may be combined with each other, and same or similar concepts or processes may not be described repeatedly in some embodiments. It should be understood that a function explained in this application may be implemented by using an independent hardware circuit, software running in combination a with processor/microprocessor or a general-purpose computer, an application-specific integrated circuit, and/or one or more digital signal processors. When described as a method, this application may alternatively be implemented in a computer processor and a memory coupled to the processor.

In the following embodiments, an example in which the terminal device supports both a first user identity (a user identity corresponding to the first SIM card) and a second user identity (a user identity corresponding to the second SIM card) is used for description. In embodiments of this application, the terminal device receives a message or information in a cell corresponding to a single user identity, to monitor paging information of a plurality of user identities.

For example, in an implementation, the terminal device is in a connected state by using the first user identity, and the terminal device is in an idle state or an inactive state by using the second user identity. The terminal device receives, in a cell corresponding to the first user identity: paging information corresponding to the second user identity. It may be understood that when the terminal device changes to the idle state by using the first user identity, the terminal device accordingly receives, in the cell corresponding to the first user identity, paging information corresponding to the first user identity.

In another implementation, the terminal device is in an idle state by using both the first user identity and the second user identity, or the terminal device is in an inactive state by using both the first user identity and the second user identity. A cell corresponding to either of the first user identity and the second user identity of the terminal device may be used as a cell (where the cell may be referred to as a first cell or a primary cell) in which paging information corresponding to the two user identities is received. For example, the terminal device may monitor a paging message in a cell corresponding to the first user identity, to monitor the paging information of the first user identity and the second user identity. That the cell corresponding to either of the first user identity and the second user identity of the terminal device is used as the cell in which the paging information corresponding to the two user identities is received may also be understood as that either of the first SIM card and the second SIM card is used as a SIM card (for example, the SIM card may be referred to as a primary card) for receiving the paging information corresponding to the two user identities.

In still another implementation, the terminal device is in an inactive state by using the first user identity, and the terminal device is in an idle state by using the second user identity. The terminal device receives a message or information in a cell corresponding to the first user identity: to monitor paging information of the first user identity and the second user identity.

It may be understood that a specific card that is determined as the foregoing primary card may be predefined. For example, it is predefined that a SIM card supporting a high-level standard is the primary card. For example, if the first SIM card is a card supporting 5G, and the second SIM card is a card supporting 4G, the first SIM may be used as the primary card as predefined. Alternatively, it may be predefined that a SIM card supporting a specific standard is the primary card. A predefinition manner is not limited in embodiments of this application.

In another possible manner, the primary card may alternatively be selected by the terminal device and indicated to one or more network side devices. For example, the terminal device may select the primary card based on a preset condition, or may randomly select the primary card. A manner in which the terminal device selects the primary card and a manner in which the terminal device indicates a selection result to the network side devices are not limited in embodiments of this application.

The following separately describes a process of a possible communication method with reference to a specific scenario.

Figure 3:
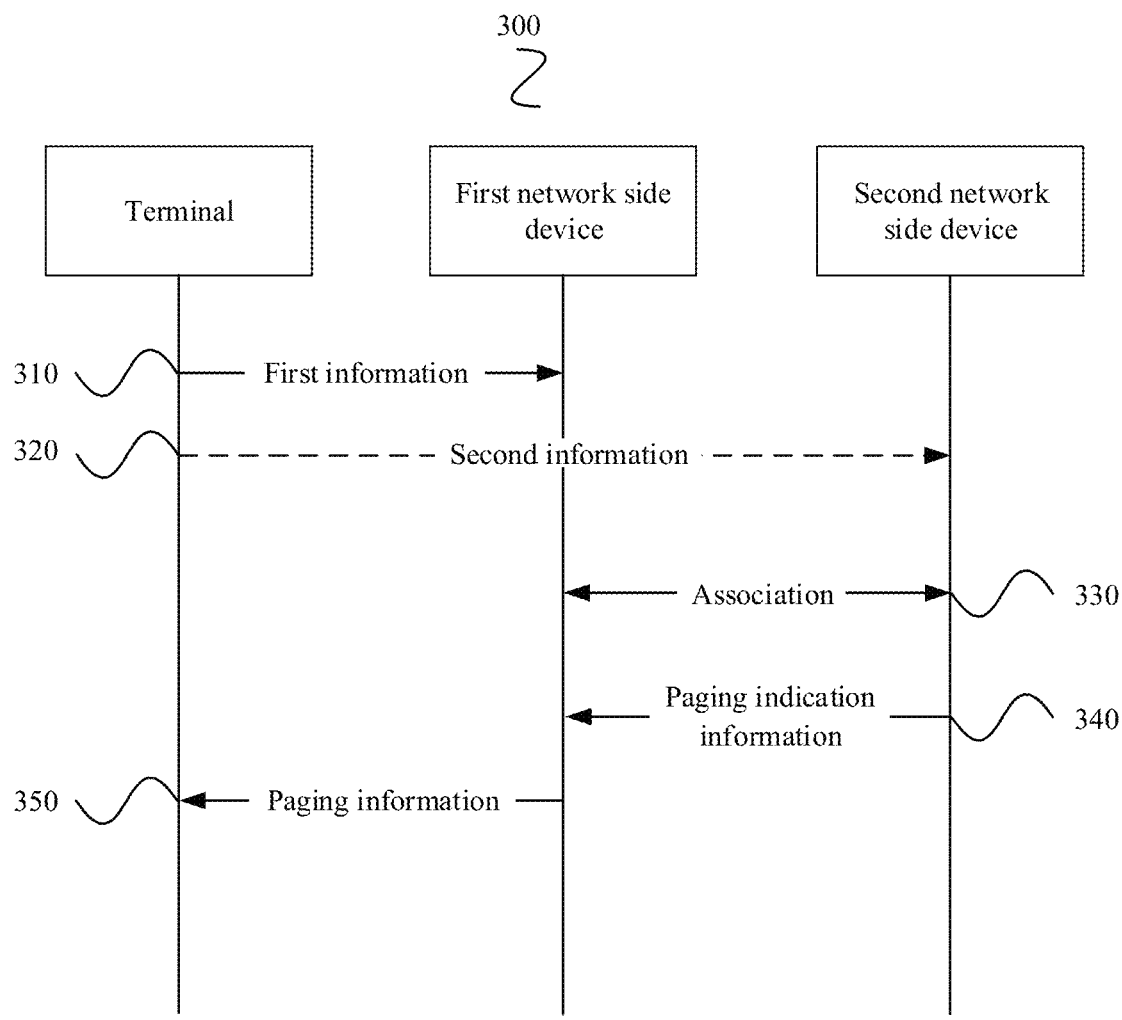
FIG. 3 is a schematic interaction diagram of a communication method 300 according to an embodiment of this application.

For example, FIG. 3 is a schematic interaction diagram of a communication method 300 according to an embodiment of this application. In FIG. 3, an example in which schematic interaction is executed by a terminal device, a first network side device, and a second network side device is used to illustrate the communication method. However, an execution body of the schematic interaction is not limited in this application.

It may be understood that, in FIG. 3, steps or procedures implemented by a network side device (for example, the first network side device or the second network side device) may alternatively be implemented by a chip, a chip system, a processor, or the like that supports the network side device in implementing the method. In FIG. 3, steps or procedures implemented by the terminal device may alternatively be implemented by a chip, a chip system, a processor, or the like that supports the terminal device in implementing the method.

The terminal device in this embodiment of this application is a dual SIM dual standby terminal device, and the terminal device supports both a first user identity (a user identity corresponding to a first SIM card) and a second user identity (a user identity corresponding to a second SIM card). The first network side device provides a service for the first user identity, and the second network side device provides a service for the second user identity. In this embodiment of this application, that a network side device provides a service for a specific user identity may be understood as that a network side device corresponding to the specific user identity of the terminal device is the network side device, that is, a service corresponding to the specific user identity of the terminal device is implemented by the network side device.

In this embodiment, both the first network side device and the second network side device are access network devices.

As shown in FIG. 3, the method 300 in this embodiment may include the following operations.

Operation 310: The terminal device sends first information to the first network side device by using the first user identity.

Accordingly, the first network side device receives the first information.

The first information may indicate first identification information corresponding to the second user identity. In a possible manner, the first identification information may be allocated by the second network side device to the terminal device corresponding to the second user identity. It may be understood that the second network side device may be an anchor base station that configures the terminal device to enter an inactive state by using the second user identity. In this case, the first identification information may include an inactive radio network temporary identifier (I-RNTI). Herein, that the second network side device configures the terminal device to enter the inactive state by using the second user identity may also be referred to as that the second network side device configures the second SIM card to enter the inactive state. Optionally, the first identification information may alternatively include an I-RNTI, an identifier of a physical cell to which the terminal device is connected by using the second user identity, and an identifier of the second network side device. Optionally, the first identification information may alternatively include an I-RNTI and a cell global identity (CGI) of a serving cell. It may be understood that, in some scenarios, the first information may alternatively be replaced with the first identification information.

After receiving the first information, the first network side device may determine, based on the first information, that both the first user identity and the second user identity correspond to the terminal device, that is, the first network side device learns that the first user identity is associated with the second user identity.

It may be understood that, in this embodiment of this application information (for example, identification information or other information) corresponding to a user identity may also be understood as information corresponding to a SIM card. Implementing an operation (for example, sending information or a message) by using a user identity may also be understood as implementing an operation by using a SIM card. Descriptions are not provided below repeatedly.

In the operation 310, there may be a plurality of different implementations in which the terminal device sends the first information to the first network side device by using the first user identity. For example, the terminal device may send the first information to the first network side device when the terminal device enters a connected state by using the first user identity. Alternatively, the terminal device may send the first information to the first network side device after the terminal device is in a connected state by using the first user identity for a period of time. Alternatively, the terminal device may send the first information to the first network side device when the terminal device obtains the first identification information in the first information by using the first user identity. Alternatively, the terminal device may send the first information to the first network side device when the terminal device establishes a connection to the first network side device by using the first user identity.

It may be understood that the terminal device supports both the first user identity and the second user identity, and the terminal device may obtain an identifier of the second user identity by using the first user identity through internal interaction.

In the foregoing implementations, in a possible manner, interaction between the terminal device and the second network side device may be performed using a Uu interface message. For example, when an RRC connection is released, the second network side device sends the I-RNTI to the terminal device using an RRC connection release message. An occasion on which and a manner in which the terminal device sends the first information to the second network side device are not limited in this embodiment of this application.

Optionally, the terminal device may further send paging conflict indication information to the second network side device by using the first user identity, to indicate, to the second network side device, that a paging conflict may occur. It may be understood that the indication information is optional. In an optional solution, the terminal device may send the first identification information, to implicitly indicate that there is a paging conflict.

Optionally, the terminal device may further send terminal monitoring indication information to the second network side device by using the first user identity, to indicate, to the second network side device, that the terminal device monitors paging information by using the first user identity (or by using the first SIM card). It may be understood that the monitoring indication information is optional.

It may be understood that the first information, the paging conflict indication information, and the monitoring indication information may be sent via a same message. For example, the first information carries the paging conflict indication information and/or the monitoring indication information. Alternatively, the first information, the paging conflict indication information, and the monitoring indication information may be sent via different messages. This is not limited in this embodiment of this application.

According to the foregoing operation 310, the terminal device sends, to the first network side device, information indicating that the first user identity of the terminal device and the second user identity of the terminal device are associated with the terminal device. This helps complete association between a plurality of user identities of the terminal device on a network side.

Operation 320: The terminal device sends second information to the second network side device by using the second user identity.

The second information may indicate second identification information corresponding to the first user identity. In a possible manner, the second identification information may be allocated by the first network side device to the terminal device corresponding to the first user identity. It may be understood that the first network side device may be an anchor base station that configures the terminal device to enter the connected state by using the first user identity. In this case, the second identification information may include a cell radio network temporary identifier (C-RNTI), an identifier of a physical cell to which the terminal device is connected by using the first user identity, and an identifier of the first network side device. Optionally, the second identification information may alternatively include a C-RNTI of the first user identity and the CGI of the serving cell. It may be understood that, in some scenarios, the second information may alternatively be replaced with the second identification information.

In another possible manner, the first network side device may be an anchor base station that configures the terminal device to enter the inactive state by using the first user identity. In this case, the second identification information may include the I-RNTI, an identifier of a physical cell to which the terminal device is connected by using the first user identity, and an identifier of the first network side device. Optionally, the second identification information may alternatively include the I-RNTI of the first user identity and the CGI of the serving cell.

After receiving the second information, the second network side device may determine, based on the second information, that both the first user identity and the second user identity correspond to the terminal device, that is, the second network side device learns that the first user identity is associated with the second user identity.

In the operation 320, there may be a plurality of different implementations in which the terminal device sends the second information to the second network side device by using the second user identity. For example, the terminal device may send the second information to the second network side device on an occasion before the terminal device enters the inactive state by using the second user identity, that is, when the second user identity is in the connected state. Alternatively, the terminal device may send the second information to the second network side device via a message (for example, a resume request message) in the inactive state by using the second user identity.

Optionally, the terminal device may further send the paging conflict indication information to the second network side device by using the second user identity, to indicate, to the second network side device, that the paging conflict may occur. It may be understood that the indication information is optional. In an optional solution, the terminal device may send the second identification information, to implicitly indicate that there is the paging conflict.

Optionally, the terminal device may further send the terminal monitoring indication information to the second network side device by using the second user identity, to indicate, to the second network side device, a user identity (or a SIM card) used by the terminal device to monitor the paging information. For example, in an optional solution, the monitoring indication information may carry an identifier of the first user identity, to indicate that the user identity used by the terminal for monitoring is the first user identity. It may be understood that the monitoring indication information is optional. In an optional solution, the terminal device may send the second identification information, to implicitly indicate that the terminal device monitors the paging information by using the first user identity (or by using the first SIM card).

It may be understood that the second information, the paging conflict indication information, and the monitoring indication information may be sent via a same message. For example, the second information carries the paging conflict indication information and/or the monitoring indication information. Alternatively, the second information, the paging conflict indication information, and the monitoring indication information may be sent via different messages. This is not limited in this embodiment of this application.

It is easy to understand that both the operation 310 and the operation 320 may be performed, only the operation 310 may be performed, or only the operation 320 may be performed. In addition, a sequence of the operations 310 and 320 is not limited in this embodiment of this application.

According to the foregoing operation 320, the terminal device sends, to the second network side device, the information indicating that the first user identity of the terminal device and the second user identity of the terminal device are associated with the terminal device. This helps complete the association between the plurality of user identities of the terminal device on the network side.

Operation 330: The first network side device and the second network side device complete association between the first user identity and the second user identity.

It may be understood that, the operation 330 may have different implementations in a scenario in which the operation 310 is performed and a scenario in which the operation 320 is performed.

For example, in the scenario in which the operation 310 is performed (only the operation 310 may be performed, or both the operation 310 and the operation 320 may be performed), a possible implementation of the operation 330 may include: The first network side device determines, based on the first information received in the operation 310, that the anchor base station corresponding to the second user identity is the second network side device. The first network side device requests to associate with the second network side device. Optionally, the first network side device may send the first identification information to the second network side device, to request the second network side device to complete the association between the first user identity and the second user identity, so that the second network side device can learn that related information may be sent through the first network side device. Further, it may also be understood that the second network side device learns that the first user identity and the second user identity belong to the same terminal device. Optionally, the first network side device may also send the second identification information to the second network side device.

Optionally, the second network side device may indicate, in response to a request of the first network side device, to the first network side device, that the association is confirmed. It may be understood that the response step is not necessary. It may alternatively be considered that the second network side device completes the association operation after receiving the first identification information sent by the first network side device, or the first identification information and the second identification information sent by the first network side device.

In the scenario in which the operation 320 is performed (only the operation 320 may be performed, or both the operation 310 and the operation 320 may be performed), a possible implementation of the operation 330 may include: The second network side device determines, based on the second information received in the operation 320, that the base station corresponding to the first user identity is the first network side device. The second network side device requests to associate with the first network side device. Optionally, the second network side device may send the second identification information to the first network side device, to request the first network side device to complete the association between the first user identity and the second user identity, so that the first network side device can learn that related information may be sent through the second network side device. Further, it may also be understood that the first network side device learns that the first user identity and the second user identity belong to the same terminal device. Optionally, the second network side device may also send the first identification information to the first network side device.

Optionally, the first network side device may indicate, in response to a request of the second network side device, to the second network side device, that the association is confirmed. It may be understood that the response step is not necessary. It may alternatively be considered that the first network side device completes the association operation after receiving the second identification information sent by the second network side device, or the first identification information and the second identification information sent by the second network side device.

In the foregoing implementations, interaction between the first network side device and the second network side device may be performed using an Xn interface message or an X2 interface message. A name of a message used in the interaction between the first network side device and the second network side device and an occasion on which the interaction is performed are not limited in this embodiment of this application. In addition, in the foregoing implementations, the operation 330 is implemented by sending the identification information of the terminal device, or the operation 330 may be implemented in another manner. For example, indication information A is sent, so that the second network side device learns that the second network side device can page the terminal device through the first network side device. The indication information A only needs to enable the second network side device to learn that the second network side device can page the terminal device through the first network side device, and content of the indication information A is not limited.

It may be understood that, in this embodiment, the method 300 is described by using an example in which the terminal device receives a message or information in the cell corresponding to the first user identity, to monitor paging information of a plurality of user identities. However, this is not limited in this application.

According to the foregoing operation 330, the first network side device and the second network side device complete the association between the first user identity of the terminal device and the second user identity of the terminal device. This helps the terminal device receive a paging message of a single user identity, to implement a function of monitoring the paging information of the plurality of user identities.

Operation 340: The second network side device sends paging indication information to the first network side device, where the paging indication information is used to indicate that the second user identity corresponding to the terminal device is to be paged.

If the second network side device needs to page the second SIM card, (that is, page the second user identity corresponding to the terminal device), the second network side device may implement the paging through the first network side device. The second network side device sends corresponding paging information to the first network side device, so that the first network side device learns that the second network side device needs to page the second SIM card.

Accordingly, the first network side device receives the paging indication information.

Optionally, before the second network side device sends the paging indication information to the first network side device, the second network side device determines to page the second user identity corresponding to the terminal device through the first network side device.

In a possible manner, after the operation 330 is completed, the second network side device determines to page the second user identity corresponding to the terminal device through the first network side device.

Another possible manner in which the second network side device determines to page the second user identity through the first network side device may include: The second network side device receives connected-state indication information from the first network side device, where the connected-state indication information indicates that the terminal device is in the connected state by using the first user identity.

Still another possible manner in which the second network side device determines to page the second user identity through the first network side device may include: The second network side device receives the paging conflict indication information from the terminal device, where the paging conflict indication information indicates that the paging conflict may occur between the first user identity and the second user identity. Optionally, the paging conflict indication information may further include information indicating that the second network side device needs to page the second user identity through the first network side device. For example, the conflict indication information further carries the identifier of the first network side device.

Yet another possible manner in which the second network side device determines to page the second user identity through the first network side device may include: The second network side device receives the monitoring indication information from the terminal device, where the monitoring indication information indicates that the terminal device receives the message or the information in the cell corresponding to the first user identity, to monitor the paging information of the plurality of user identities. For example, the monitoring indication information carries the second identification information.

According to the foregoing operation 340, the second network side device pages the second user identity of the terminal device through the first network side device. That is, when the second network side device needs to page the second user identity, the second network side device determines to page the second user identity of the terminal device through the first network side device.

Operation 350): The first network side device indicates, to the terminal device corresponding to the first user identity, that the second user identity is to be paged.

That is, when the second network side device needs to page the second user identity of the terminal device, the second network side device pages the second user identity of the terminal device through a network, the cell, a channel, or a link corresponding to the first user identity:

It may be understood that, for different scenarios in which the terminal device is in a state by using the first user identity and the second user identity, the operation 350 may have different implementations.

For example, in a scenario in which the terminal device is in the connected state by using the first user identity and the terminal device is in the inactive state by using the second user identity, a possible implementation of the operation 350 may include: The first network side device sends a radio resource control (RRC) message to the terminal device corresponding to the first user identity, where the RRC message includes information indicating that the second user identity is to be paged, and the information indicating that the second user identity is to be paged indicates that the second network side device is to page the second user identity of the terminal device. For example, the RRC message may include content in the paging indication information. Alternatively, the RRC message may include paging information, and the paging information may be paging information processed based on the paging indication information. In this embodiment of this application, content of the RRC message is not limited, provided that the terminal device can learn that the second network side device is to page the second user identity.

The terminal device receives the RRC message by using the first user identity, and the terminal device learns, based on the RRC message, that the second network side device is to page the second user identity, so that the terminal device attempts to enter the connected state by using the second user identity. That is, after the second user identity of the terminal device is paged, the terminal device attempts to restore a connection to the network side device. If the connection is successfully restored, the terminal device may enter the connected state by using the second user identity.

Optionally, the RRC message may include the identification information of the terminal device corresponding to the second user identity, or include the identification information of the terminal device corresponding to the first user identity and the identification information of the terminal device corresponding to the second user identity. In a possible manner, the terminal device determines, based on the identification information of the terminal device in the received RRC message, that the RRC message indicates that the second network side device is to page the second user identity.

It should be noted that the terminal device is in the connected state by using the first user identity, that is, the first SIM card of the terminal device is in the connected state, and the terminal device is in the inactive state by using the second user identity, that is, the second SIM card of the terminal device is in the inactive state.

In a scenario in which the terminal device is in the inactive state by using the first user identity and the terminal device is in the inactive state by using the second user identity, a possible implementation of the operation 350 may include: The first network side device sends a radio access network paging message to the terminal device corresponding to the first user identity, where the radio access network paging message includes information indicating that the second user identity is to be paged, and the information indicating that the second user identity is to be paged indicates that the second network side device is to page the second user identity of the terminal device. For example, the radio access network paging message may include content in the paging indication information. Alternatively, the radio access network paging message may include paging information, and the paging information may be paging information processed based on the paging indication information. In this embodiment of this application, content of the radio access network paging message is not limited, provided that the terminal device can learn that the second network side device is to page the second user identity.

The terminal device receives the radio access network paging message by using the first user identity, and the terminal device learns, based on the radio access network paging message, that the second network side device is to page the second user identity, so that the terminal device attempts to enter the connected state by using the second user identity. Optionally, the radio access network paging message may include the identification information of the terminal device corresponding to the second user identity, or include the identification information of the terminal device corresponding to the first user identity and the identification information of the terminal device corresponding to the second user identity. The terminal device determines, based on the identification information, that the radio access network paging message indicates that the second user identity is to be paged.

In the method 300, after the first network side device and the second network side device complete the association, when the second network side device needs to page the second user identity, the second network side device sends the paging indication information to the first user identity, to indicate that the second user identity is to be paged. Using the foregoing implementation method resolves a potential conflict that occurs when the terminal device monitors a paging message initiated by a network side device, and ensures that the terminal device can receive the paging message of the network side device in a timely manner by using two user identities.

Figure 3A:
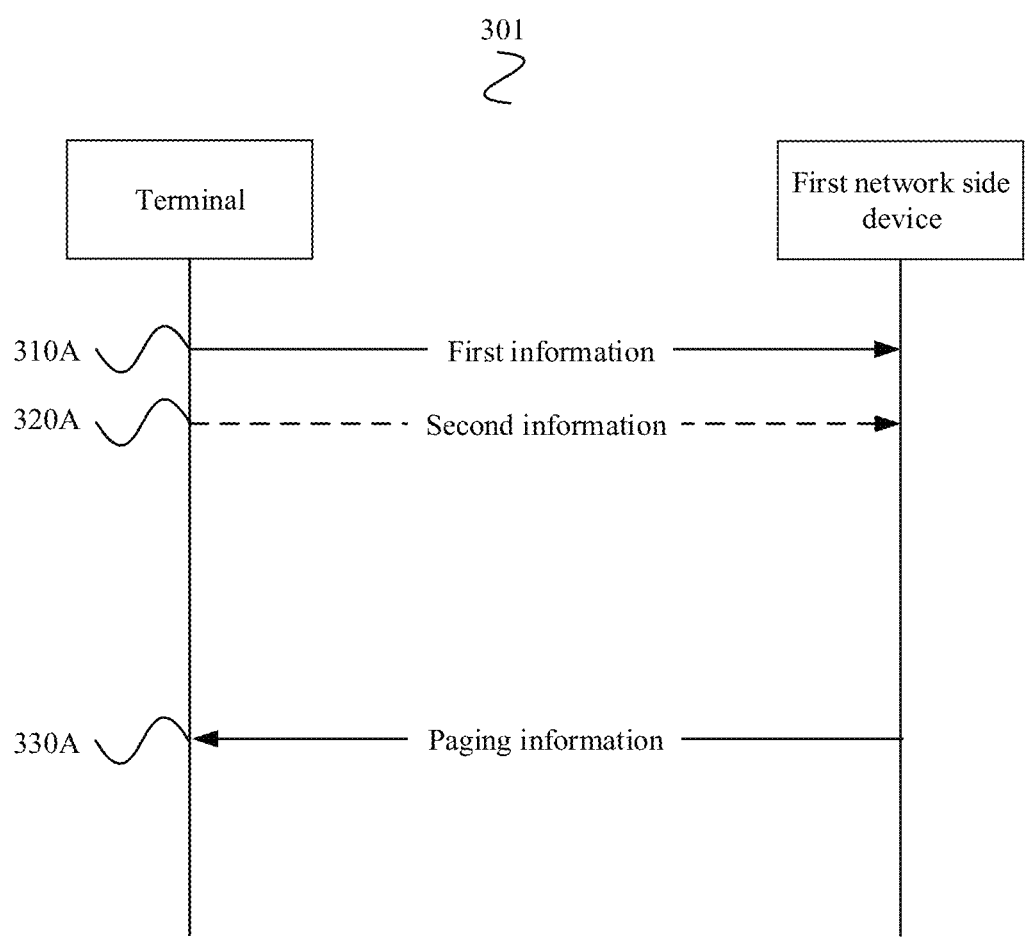
FIG. 3A is a schematic interaction diagram of a communication method 301 according to an embodiment of this application.

Optionally, in the embodiment shown in FIG. 3, an example in which the first network side device and the second network side device are different network side devices is used for description. It is easy to understand that the first network side device and the second network side device may alternatively be a same network side device. When the first network side device and the second network side device are a same network side device, as shown in FIG. 3A, an embodiment of this application further provides a communication method 301. The method 301 may include an operation 310A, an operation 320A, and an operation 350A.

Operation 310A: A terminal device sends first information to a first network side device by using a first user identity.

Accordingly, the first network side device receives the first information. For the operation 310A, refer to the descriptions of the operation 310 in the method 300.

Operation 320A: The terminal device sends second information to the first network side device by using a second user identity.

Accordingly, the first network side device receives the second information. For the operation 320A, refer to the descriptions of the operation 320 in the method 300. Further, different from the operation 320 in the method 300, the operation 320A in the method 301 is sending the second information to the first network side device.

It is easy to understand that both the operation 310A and the operation 320A may be performed, only the operation 310A may be performed, or only the operation 320A may be performed. In addition, a sequence of the operations 310A and 320A is not limited in this embodiment of this application.

For example, in a scenario in which the operation 310A is performed (only the operation 310A may be performed, or both the operation 310A and the operation 320A may be performed), the first network side device determines, based on the first information received in the operation 310A, that an anchor base station corresponding to the second user identity is the first network side device. The first network side device learns that the first user identity and the second user identity belong to the same terminal device.

In a scenario in which the operation 320A is performed (only the operation 320A may be performed, or both the operation 310A and the operation 320A may be performed), the first network side device determines, based on the second information received in the operation 320A, that an anchor base station corresponding to the first user identity is the first network side device. The first network side device learns that the first user identity and the second user identity belong to the same terminal device.

Operation 330A: The first network side device sends paging information to the terminal device corresponding to the first user identity, where the paging information is used to indicate that the second user identity is to be paged.

Compared with the method 300, the method 301 does not have a step of related interaction between the first network side device and a second network side device on completing an association operation. When the first network side device needs to page the second user identity of the terminal device, the first network side device pages the second user identity of the terminal device through a network, a cell, a channel, or a link corresponding to the first user identity. For a specific manner of paging the second user identity of the terminal device, refer to the descriptions of the operation 350 in the method 300.

In the method 301, the first network side device provides services for the first user identity and the second user identity of the terminal device. When the first network side device needs to page the second user identity, the first network side device sends the paging information to the first user identity, to page the second user identity. Using the foregoing implementation method resolves a potential conflict that occurs when the terminal device monitors a paging message initiated by a network side device, and ensures that the terminal device can receive the paging message of the network side device in a timely manner by using two user identities.

It should be noted that the foregoing methods 300 and 301 are implemented through interaction between a network side device that provides a service for the terminal device and the terminal device. In another possible solution, there may be a third node (or a third device). The node may interact with the first network side device and the second network side device. For example, both the first network side device and the second network side device may send related information (for example, an identifier of the network side device and an identifier of a user identity) to the third node, so that the third node associates the first user identity with the second user identity. Therefore, when the second network side device needs to page the second user identity of the terminal device, the second network side device may send corresponding paging information to the first network side device through the third node, so that the first network side device can learn that the second network side device needs to page the second user identity, to complete a subsequent procedure of paging the second user identity of the terminal device.

Figure 4:
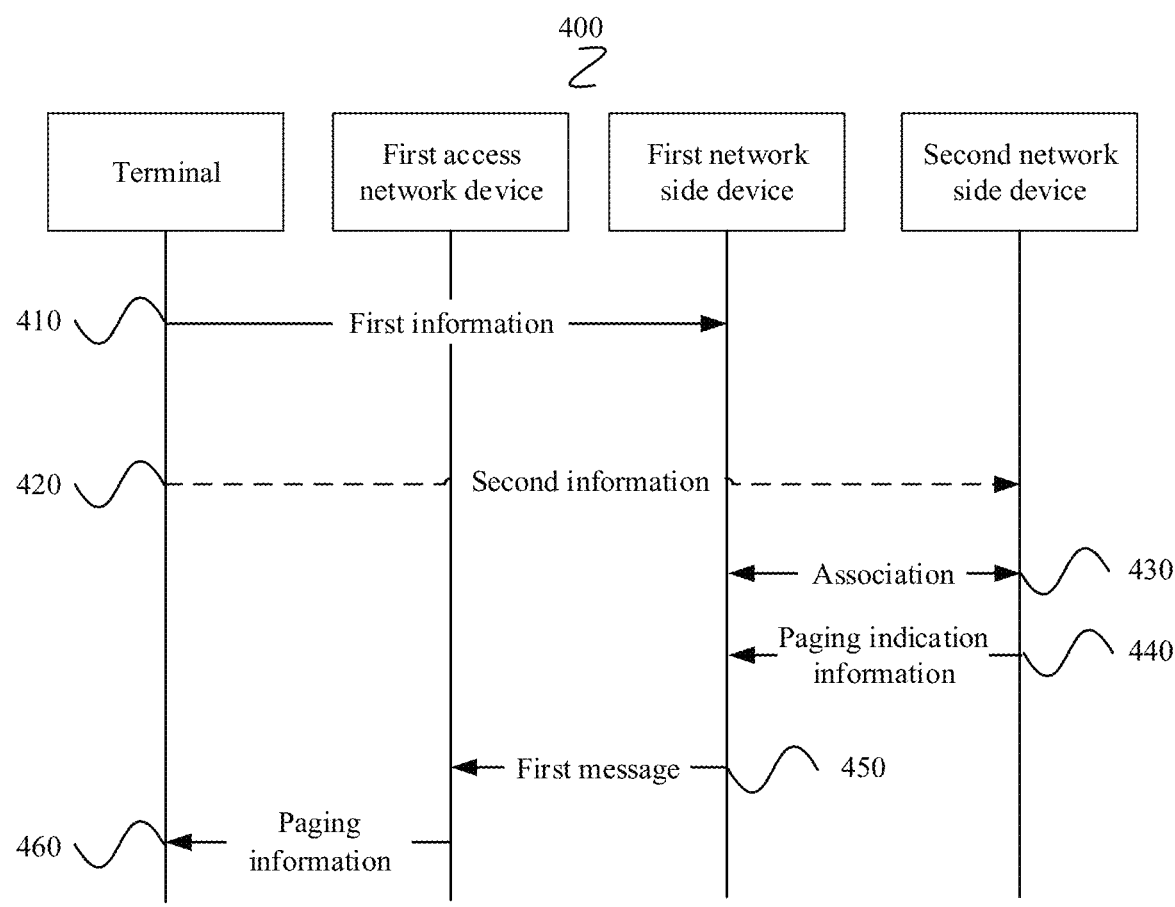
FIG. 4 is a schematic interaction diagram of a communication method 400 according to an embodiment of this application.

FIG. 4 is a schematic interaction diagram of a communication method 400 according to an embodiment of this application. In FIG. 4, an example in which schematic interaction is executed by a terminal device, a first access network device, a first network side device, and a second network side device is used to illustrate the communication method. However, an execution body of the schematic interaction is not limited in this application.

It may be understood that, in FIG. 4, steps or procedures implemented by a network side device (for example, the first network side device or the second network side device) may alternatively be implemented by a chip, a chip system, a processor, or the like that supports the network side device in implementing the method. In FIG. 4, steps or procedures implemented by the first access network device may alternatively be implemented by a chip, a chip system, a processor, or the like that supports the first access network device in implementing the method. In FIG. 4, steps or procedures implemented by the terminal device may alternatively be implemented by a chip, a chip system, a processor, or the like that supports the terminal device in implementing the method.

The terminal device in this embodiment of this application is a dual SIM dual standby terminal, and the terminal device supports both a first user identity (a user identity corresponding to a first SIM card) and a second user identity (a user identity corresponding to a second SIM card). The first network side device provides a service for the first user identity, the second network side device provides a service for the second user identity, and the first access network device serves the first user identity. In this embodiment of this application, that a network side device provides a service for a specific user identity may be understood as that a network side device corresponding to the specific user identity of the terminal device is the network side device, that is, a service corresponding to the specific user identity of the terminal device is implemented by the network side device.

In this embodiment, both the first network side device and the second network side device are core network devices. Therefore, the first network side device may also be referred to as a first core network device, and the second network side device may also be referred to as a second core network device.

It may be understood that the first SIM card and the second SIM card of the terminal device are registered with respective corresponding core network devices. For example, the terminal device sends, by using the first user identity, a globally unique identifier (for example, a first international mobile subscriber identity IMSI) corresponding to the first user identity to the first core network device, the terminal device sends, by using the second user identity, a globally unique identifier (for example, a second IMSI) corresponding to the second user identity to the second core network device, and the first core network device and the second core network device respectively allocate, to the first user identity and the second user identity of the terminal device, a terminal device identifier that can identify the terminal device within a core network range. For example, in an LTE system, the terminal device identifier may be a system architecture evolution temporary mobile subscriber identifier (S-TMSI). In a 5G system, the terminal device identifier may be a 5G system architecture evolution temporary mobile subscriber identifier (5G system architecture evolution temporary mobile subscription identifier, 5G-S-TMSI).

As shown in FIG. 4, the method 400 in this embodiment may include the following operations.

Operation 410: The terminal device sends first information to the first core network device by using the first user identity.

Accordingly, the first core network device receives the first information. The first information may indicate first identification information corresponding to the second user identity.

In a possible manner, the first information may be sent by the terminal device in a registration process, and the first information may include the globally unique identifier corresponding to the second user identity. That is, in the process in which the terminal device is registered with the first core network device by using the first user identity, in addition to sending the globally unique identifier corresponding to the first user identity to the first core network device, the terminal device may further send the globally unique identifier corresponding to the second user identity and an identifier of the second core network device to the first core network device.

In another possible manner, the first information may be sent by the terminal device after the terminal device has been registered with the second core network device. For example, the terminal device may send, to the first core network device, the terminal device identifier allocated by the second core network device to the second user identity of the terminal device. Optionally, in this manner, the terminal device may further send the globally unique identifier corresponding to the second user identity and an identifier of the second core network device to the first core network device.

It may be understood that the terminal device sends information or a message to a core network device through an access network device.

After receiving the first information, the first core network device may determine, based on the first information, that both the first user identity and the second user identity correspond to the terminal device, that is, the first core network device learns that the first user identity is associated with the second user identity.

In the operation 410, there may be a plurality of different implementations in which the terminal device sends the first information to the first core network device by using the first user identity. For example, the terminal device may send the first information to the first core network device by using non-access stratum (NAS) signaling when the terminal device enters a connected state by using the first user identity. Alternatively, the terminal device may send the first information to the first core network device after the terminal device is in a connected state by using the first user identity for a period of time. Alternatively, the terminal device may send the first information to the first core network device when the terminal device obtains the first identification information in the first information by using the first user identity. It may be understood that, in some scenarios, the first information may alternatively be replaced with the first identification information.

According to the foregoing operation 410, the terminal device sends, to the first core network device, information indicating that the first user identity of the terminal device and the second user identity of the terminal device are associated with the terminal device. This helps the first core network device and the second core network device complete association between a plurality of user identities of the terminal device.

Operation 420: The terminal device sends second information to the second core network device by using the second user identity.

Herein, a manner in which the terminal device sends the second information may be similar to a manner in which the terminal device sends the first information. Details are not described herein again. The second information may indicate second identification information corresponding to the first user identity. It may be understood that, in some scenarios, the second information may alternatively be replaced with the second identification information.

Optionally, the terminal device may further send paging conflict indication information to the second core network device by using the second user identity through the access network device, to indicate, to the second core network device, that a paging conflict may occur. It may be understood that the indication information is optional. In an optional solution, the terminal device may send the second identification information, to implicitly indicate that there is a paging conflict.

Optionally, the terminal device may further send terminal monitoring indication information to the second core network device by using the second user identity through the access network device, to indicate, to the second core network device, that the terminal device monitors paging information by using the first user identity (or by using the first SIM card). For example, in an optional solution, the monitoring indication information may carry an identifier of the first user identity, to indicate that a user identity used by the terminal for monitoring is the first user identity. It may be understood that the monitoring indication information is optional. In an optional solution, the terminal device may send the second identification information, to implicitly indicate a user identity used by the terminal for monitoring.

It may be understood that the second information, the paging conflict indication information, and the monitoring indication information may be sent via a same message. For example, the second information carries the paging conflict indication information and/or the monitoring indication information. Alternatively, the second information, the paging conflict indication information, and the monitoring indication information may be sent via different messages. This is not limited in this application.

It is easy to understand that both the operation 410 and the operation 420 may be performed, only the operation 410 may be performed, or only the operation 420 may be performed. In addition, a sequence of the operations 410 and 420 is not limited in this embodiment of this application.

According to the foregoing operation 420, the terminal device sends, to the first core network device, the information indicating that the first user identity of the terminal device and the second user identity of the terminal device are associated with the terminal device. This helps the first core network device and the second core network device complete the association between the plurality of user identities of the terminal device.

Operation 430): The first core network device and the second core network device complete association between the first user identity and the second user identity.

It may be understood that, the operation 430 may have different implementations in a scenario in which the operation 410 is performed and a scenario in which the operation 420 is performed.

For example, in the scenario in which the operation 410 is performed (only the operation 410 may be performed, or both the operation 410 and the operation 420 may be performed), a possible implementation of the operation 430 may include: The first core network device determines, based on the first information (for example, the terminal device identifier (for example, the 5G-S-TMSI) allocated by the second core network device to the second user identity of the terminal device) received in the operation 410, the second core network device corresponding to the second user identity. The first core network device requests to associate with the second core network device. Optionally, the first core network device may send the first identification information to the second core network device, to request the second core network device to complete the association between the first user identity and the second user identity, so that the second core network device can learn that related information may be sent through the first core network device. Further, it may also be understood that the second core network device learns that the first user identity and the second user identity belong to the same terminal device, that is, the first SIM card and the second SIM card share the same terminal device. Optionally, the first core network device may also send the second identification information to the second core network device.

Optionally, the second core network device may indicate, in response to a request of the first core network device, to the first core network device, that the association is confirmed. It may be understood that the response step is not necessary. It may alternatively be considered that the second core network device completes the association operation after receiving the first identification information sent by the first core network device, or the first identification information and the second identification information sent by the first core network device.

In the scenario in which the operation 420 is performed (only the operation 420 may be performed, or both the operation 410 and the operation 420 may be performed), a possible implementation of the operation 430 may include: The second core network device determines, based on the second information (for example, the 5G-S-TMSI of the first user identity) received in the operation 420, the first core network device corresponding to the first user identity. The second core network device requests to associate with the first core network device. Optionally, the second core network device may send the second identification information to the first core network device, to request the first core network device to complete the association between the first user identity and the second user identity, so that the first core network device can learn that related information may be sent through the second core network device. Further, it may also be understood that the first core network device learns that the first user identity and the second user identity belong to the same terminal device. Optionally, the second core network device may also send the first identification information to the first core network device.

Optionally, the first core network device may indicate, in response to a request of the second core network device, to the second core network device, that the association is confirmed. It may be understood that the response step is not necessary. It may alternatively be considered that the first core network device completes the association operation after receiving the second identification information sent by the second core network device, or the first identification information and the second identification information sent by the second core network device.

According to the foregoing operation 430, the first core network device and the second core network device complete the association between the first user identity of the terminal device and the second user identity of the terminal device. This helps the terminal device receive a paging message of a single user identity, to implement a function of monitoring paging information of the plurality of user identities.

Operation 440: The second core network device sends paging indication information to the first core network device, where the paging indication information is used to indicate that the second user identity corresponding to the terminal device is to be paged.

If the second core network device needs to page the second SIM card, (that is, page the second user identity corresponding to the terminal device), the second core network device may implement the paging through the first core network device. The second core network device sends corresponding paging information to the first core network device, so that the first core network device learns that the second core network device needs to page the second SIM card.

Accordingly, the first core network device receives the paging indication information.

The paging indication information carries the identification information of the terminal device corresponding to the second user identity, for example, the IMSI or the 5G-S-TMSI of the second user identity.

Optionally, before the second core network device sends the paging indication information to the first core network device, the second core network device determines that the second core network device needs to page the second user identity corresponding to the terminal device through the first core network device.

In a possible manner, after the operation 430 is completed, the second core network device determines to page the second user identity corresponding to the terminal device through the first core network device.

A possible manner in which the second core network device determines to page the second user identity through the first core network device may include: The second core network device receives connected-state indication information from the first core network device, where the connected-state indication information indicates that the terminal device is in the connected state by using the first user identity.

Another possible manner in which the second core network device determines to page the second user identity through the first core network device may include: The second core network device receives the paging conflict indication information from the terminal device, where the paging conflict indication information indicates that the paging conflict may occur between the first user identity and the second user identity. Optionally, the paging conflict indication information may further include information indicating that the second core network device needs to page the second user identity through the first core network device. For example, the conflict indication information further carries an identifier of the first core network device.

Still another possible manner in which the second core network device determines to page the second user identity through the first core network device may include: The second core network device receives the monitoring indication information from the terminal device, where the monitoring indication information indicates that the terminal device receives a message or information in a cell corresponding to the first user identity, to monitor the paging information of the plurality of user identities. For example, the monitoring indication information carries the second identification information.

According to the foregoing operation 440, the second core network device pages the second user identity of the terminal device through the first core network device. That is, when the second core network device needs to page the second user identity, the second core network device determines to page the second user identity of the terminal device through the first core network device.

Operation 450: The first core network device sends a first message to the first access network device, where the first message is used to indicate that the second user identity is to be paged.

It may be understood that, for different scenarios in which the terminal device is in a state by using the first user identity and the second user identity, the operation 450 may have different implementations.

For example, in a scenario in which the terminal device is in the connected state by using the first user identity, and the terminal device is in an idle state by using the second user identity, a possible implementation of the operation 450 may include: The first core network device indicates the first access network device to send an RRC message to the terminal device, where the RRC message is a message sent to the first user identity of the terminal device, and the RRC message indicates that the second user identity of the terminal device is to be paged, that is, indicates, to the terminal device, that the second core network device is to page the second user identity of the terminal device.

For example, in a scenario in which the terminal device is in an idle state by using the first user identity, and the terminal device is in the idle state by using the second user identity, a possible implementation of the operation 450 may include: The first core network device indicates the first access network device to send a first paging message to the terminal device, where the first paging message is a message sent to the first user identity of the terminal device, and the first paging message indicates that the second user identity of the terminal device is to be paged.

For example, in a scenario in which the terminal device is in an inactive state by using the first user identity, and the terminal device is in an idle state by using the second user identity, a possible implementation of the operation 450 may include: The first core network device indicates the first access network device to send a second paging message to the terminal device, where the second paging message is a message sent to the first user identity of the terminal device, and the second paging message indicates that the second user identity of the terminal device is to be paged. In this scenario, another possible implementation of the operation 450) may include: The first core network device indicates the first access network device to send a radio access network paging message to the terminal device, where the radio access network paging message is a message sent to the first user identity of the terminal device, and the radio access network paging message indicates that the second user identity of the terminal device is to be paged.

In the foregoing implementations, interaction between the first core network device and the first access network device may be performed using an SI interface message or an NG interface message. A name of a message used in the interaction between the first core network device and the first access network device and an occasion on which the interaction is performed are not limited in this embodiment of this application.

Operation 460: The first access network device sends the paging information to the terminal device corresponding to the first user identity, where the paging information is used to indicate that the second user identity is to be paged.

It may be understood that, for different scenarios in which the terminal device is in a state by using the first user identity and the second user identity, the operation 460 may have different implementations.

For example, in a scenario in which the terminal device is in the connected state by using the first user identity, and the terminal device is in the idle state by using the second user identity, a possible implementation of the operation 460 may include: The first access network device sends the RRC message to the terminal device corresponding to the first user identity. The paging information used to indicate that the second user identity is to be paged may be included in the RRC message, and the paging information used to indicate that the second user identity is to be paged indicates that the second core network device is to page the second user identity of the terminal device. In this embodiment of this application, content of the RRC message is not limited, provided that the terminal device can learn that the second core network device is to page the second user identity.

Optionally, the RRC message may include the identification information of the terminal device corresponding to the second user identity, or include the identification information of the terminal device corresponding to the first user identity and the identification information of the terminal device corresponding to the second user identity, for example, include the S-TMSI or the 5G-S-TMIS of the second user identity. The terminal device determines, based on the identification information, that the RRC message indicates that the second user identity is to be paged.

Optionally, the RRC message may include access indication information, and the access indication information indicates the terminal device to initiate random access in a current cell by using the second user identity.

Optionally, the RRC message may further include either or both of the following: an access type and a core network domain. The access type is used to indicate that the paging is performed due to a non-3rd generation partnership project (3GPP) session. The core network domain is used to indicate whether the paging is circuit switched (CS) domain paging or packet switched domain paging. Optionally, the information included in the RRC message may be sent by the second core network device to the first access network device.

Accordingly, the terminal device receives the RRC message by using the first user identity, and the terminal device attempts, based on the RRC message, to enter the connected state by using the second user identity. That is, after the second user identity of the terminal device is paged, the terminal device attempts to restore a connection to the network side device. If the connection is successfully restored, the terminal device may enter the connected state by using the second user identity.

For example, in a scenario in which the terminal device is in the idle state by using the first user identity, and the terminal device is in the idle state by using the second user identity, a possible implementation of the operation 460 may include: The first access network device sends the first paging message to the terminal device. The paging information used to indicate that the second user identity is to be paged may be included in the first paging message, the first paging message is a message sent to the first user identity of the terminal device, and the first paging message indicates that the second user identity of the terminal device is to be paged.

Optionally, the paging information that is used to indicate that the second user identity is to be paged and that is included in the first paging message may be the identification information of the terminal device corresponding to the second user identity, or may be the identification information of the terminal device corresponding to the first user identity and the identification information of the terminal device corresponding to the second user identity. The terminal device determines, based on the paging information used to indicate that the second user identity is to be paged, that the first paging message indicates that the second user identity is to be paged.

The terminal device receives the first paging message by using the first user identity, and the terminal device learns, based on the first paging message, that the second core network device is to page the second user identity, so that the terminal device attempts to enter the connected state by using the second user identity. That is, after the second user identity of the terminal device is paged, the terminal device attempts to restore a connection to the network side device. If the connection is successfully restored, the terminal device may enter the connected state by using the second user identity.

For example, in a scenario in which the terminal device is in the inactive state by using the first user identity, and the terminal device is in the idle state by using the second user identity, a possible implementation of the operation 460 may include: The first access network device sends the second paging message to the terminal device. The paging information used to indicate that the second user identity is to be paged may be included in the second paging message, the second paging message is a message sent to the first user identity of the terminal device, and the second paging message indicates that the second user identity of the terminal device is to be paged.

Optionally, the paging information that is used to indicate that the second user identity is to be paged and that is included in the second paging message may be the identification information of the terminal device corresponding to the second user identity, or may be the identification information of the terminal device corresponding to the first user identity and the identification information of the terminal device corresponding to the second user identity. The terminal device determines, based on the paging information, that the second paging message indicates that the second user identity is to be paged.

The terminal device receives the second paging message by using the first user identity, and the terminal device learns, based on the second paging message, that the second core network device is to page the second user identity, so that the terminal device attempts to enter the connected state by using the second user identity. That is, after the second user identity of the terminal device is paged, the terminal device attempts to restore a connection to the network side device. If the connection is successfully restored, the terminal device may enter the connected state by using the second user identity.

In the method 400, after the first core network device and the second core network device complete the association, when the second core network device needs to page the second user identity, the second core network device indicates the access network device serving the first user identity to send the paging information to the first user identity, to page the second user identity: According to the foregoing implementation methods, the terminal device receives the message or the information in a cell corresponding to a single user identity, to monitor paging messages of the plurality of user identities, and ensure that two user identities of the terminal device can receive the paging messages in a timely manner.

Figure 4A:
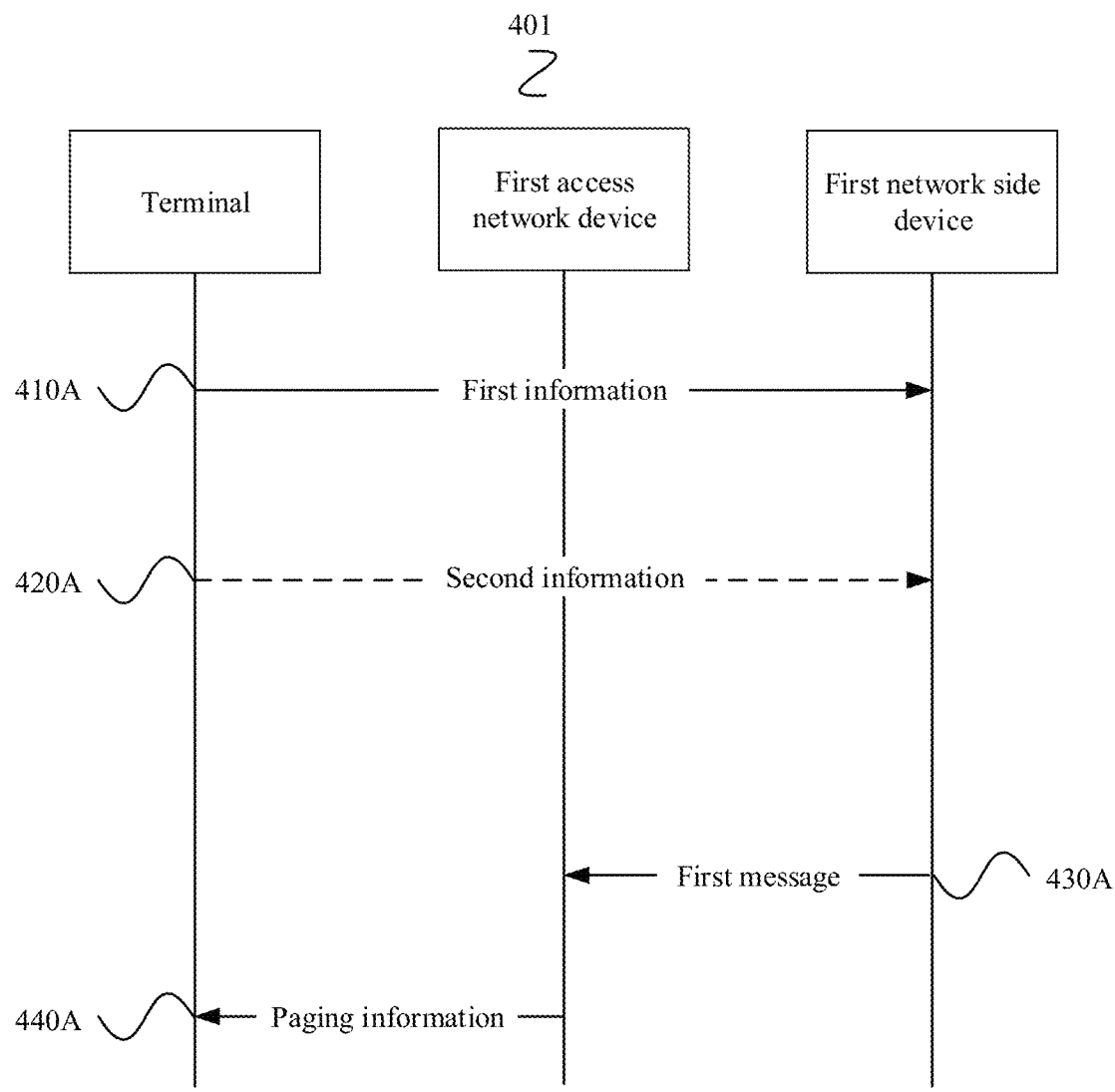
FIG. 4A is a schematic interaction diagram of a communication method 401 according to an embodiment of this application.

Optionally, in the embodiment shown in FIG. 4, an example in which the first core network device and the second core network device are different core network devices is used for description. It is easy to understand that the first core network device and the second core network device may alternatively be a same core network device. When the first core network device and the second core network device are the same core network device, as shown in FIG. 4A, this embodiment further provides a communication method 401. The method 401 may include an operation 410A, an operation 420A, an operation 450A, and an operation 460A.

Operation 410A: A terminal device sends first information to a first core network device by using a first user identity through a first access network device.

Accordingly, the first core network device receives the first information. For the operation 410A, refer to the descriptions of the operation 410 in the method 400.

Operation 420A: The terminal device sends second information to the first core network device by using a second user identity.

Accordingly, the first core network device receives the second information. For the operation 420A, refer to the descriptions of the operation 420 in the method 400. Further, different from the operation 420 in the method 400, the operation 420A in the method 401 is sending the second information to the first core network device.

It is easy to understand that both the operation 410A and the operation 420A may be performed, only the operation 410A may be performed, or only the operation 420A may be performed. In addition, a sequence of the operations 410A and 420A is not limited in this embodiment of this application.

For example, in a scenario in which the operation 410A is performed (only the operation 410A may be performed, or both the operation 410A and the operation 420A may be performed), the first core network device determines, based on the first information received in the operation 410A, that a core network device corresponding to the second user identity is the first core network device. It is easy to understand that the first core network device may determine that the first user identity and the second user identity belong to the same terminal device.

In a scenario in which the operation 420A is performed (only the operation 420A may be performed, or both the operation 410A and the operation 420A may be performed), the first core network device determines, based on the second information received in the operation 420A, that a core network device corresponding to the first user identity is the first core network device. It is easy to understand that the first core network device may determine that the first user identity and the second user identity belong to the same terminal device.

Operation 430A: The first core network device sends a first message to the first access network device, where the first message is used to indicate that the second user identity is to be paged. Compared with the method 400, the method 401 does not have a step of related interaction between the first core network device and a second core network device on completing an association operation. When the first core network device needs to page the second user identity of the terminal device, the first core network device pages the second user identity of the terminal device through a network, a cell, a channel, or a link corresponding to the first user identity. For a specific manner of paging the second user identity of the terminal device, refer to the descriptions of the operation 450 in the method 400.

Operation 440A: The first access network device sends paging information to the terminal device corresponding to the first user identity, where the paging information is used to indicate that the second user identity is to be paged.

For the operation 440 A, refer to the descriptions of the operation 460 in the method 400.

In the method 401, the first core network device provides services for the first user identity and the second user identity of the terminal device. When the first core network device needs to page the second user identity, the first core network device indicates the access network device serving the first user identity to send the paging information to the first user identity, to page the second user identity. Using the method 401 resolves a potential paging conflict, and ensures that two user identities of the terminal device can receive paging messages in a timely manner.

It should be noted that the foregoing methods 400 and 401 are implemented through interaction between an access network device and a core network device that provide services for the terminal device and the terminal device. In another possible solution, there may be a fourth node (or a fourth device). The node may interact with the first core network device and the second core network device. For example, both the first core network device and the second core network device may send related information (for example, an identifier of the core network device and an identifier of a user identity) to the fourth node, so that the fourth node associates the first user identity with the second user identity. Therefore, when the second core network device needs to page the second user identity of the terminal device, the second core network device may send corresponding paging information to the first core network device through the fourth node, so that the first core network device can learn that the second core network device needs to page the second user identity, to complete a subsequent procedure of paging the second user identity of the terminal device.

In the foregoing methods, the terminal device sends, to the network side device, the information indicating that the first user identity of the terminal device and the second user identity of the terminal device are associated with the terminal device, and the network side device completes the association between the first user identity of the terminal device and the second user identity of the terminal device. The terminal device receives the paging-related message or paging-related information in the cell corresponding to the single user identity, to monitor the paging information of the plurality of user identities of the terminal device, so that the plurality of user identities of the terminal device can be effectively paged.

Apparatuses provided in embodiments of this application are described below in detail with reference to FIG. 5 and FIG. 6. It should be understood that descriptions of apparatus embodiments correspond to the descriptions of the method embodiments. Therefore, for content that is not described in detail, refer to the method embodiments. For brevity, some content is not described herein again.

Figure 5:
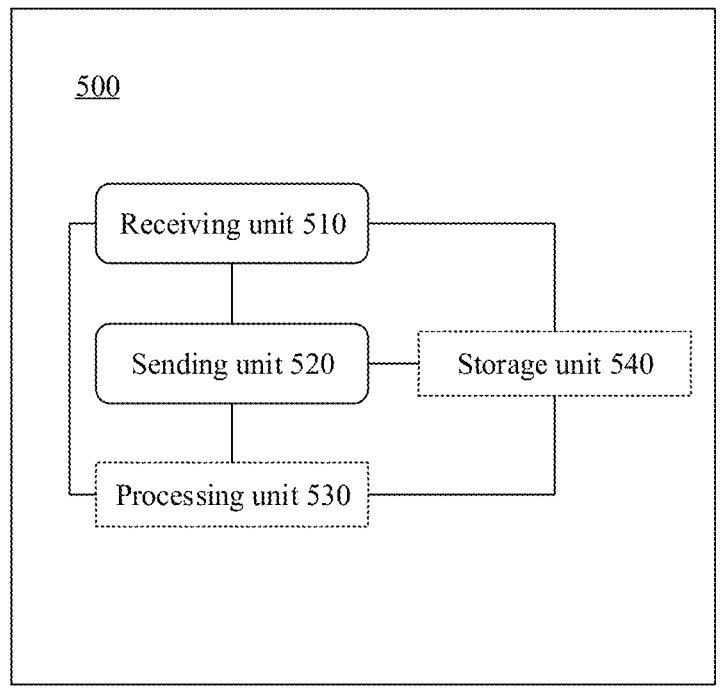
FIG. 5 is a schematic diagram of a structure of a communication apparatus according to an embodiment of this application.
Figure 6:
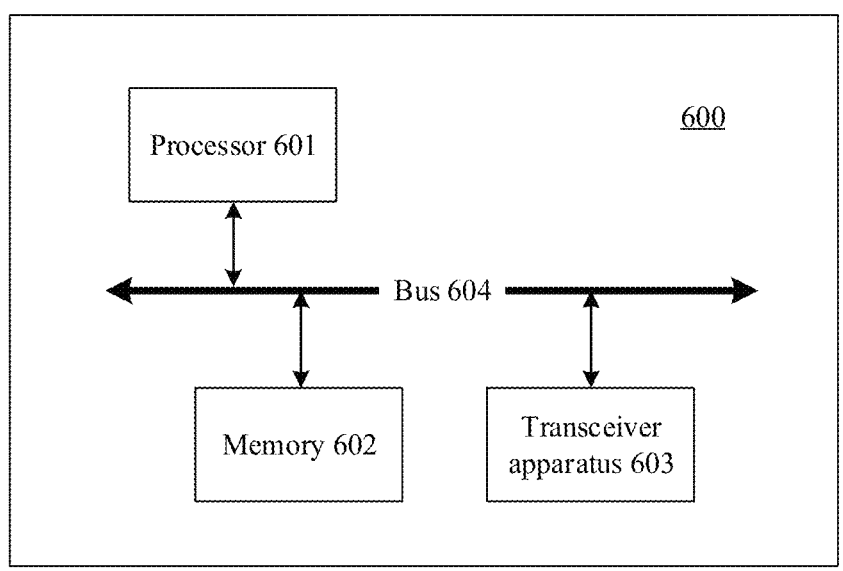
FIG. 6 is a schematic diagram of another communication apparatus according to an embodiment of this application.

FIG. 5 shows a communication apparatus 500 according to an embodiment of this application. The following describes a structure and a function of the communication apparatus 500 with reference to FIG. 5. It should be understood that the communication apparatus 500 may implement any function corresponding to the communication device in the embodiment shown in any one of FIG. 3 to FIG. 4A. The communication apparatus 500 may be the terminal device mentioned in the foregoing embodiments, or may be the first network side device, the second network side device, or the first access network device. The communication apparatus 500 includes a receiving unit 510 and a sending unit 520. Optionally, the communication apparatus may further include at least one processing unit 530. Optionally, the communication apparatus may further include a storage unit 540. The storage unit may store data and/or instructions (or may be referred to as code or a program). The receiving unit 510, the sending unit 520), and the processing unit 530 may interact with the storage unit 540. For example, the processing unit 530 may invoke the data or the instructions in the storage unit, to enable the communication apparatus to implement a corresponding method.

It should be noted that the processing unit in this embodiment of this application may be referred to as a processing module or a processing circuit, the receiving unit may also be referred to as a receiving module, and the sending unit may also be referred to as a sending module. Alternatively, the receiving unit and the transceiver unit may form a transceiver unit, a communication interface, an input/output circuit, or the like.

In a possible design, the communication apparatus 500 may correspondingly implement corresponding operations of the terminal device in the foregoing method embodiments. For example, the communication apparatus 500 may be the terminal device, or may be a component (for example, a processor, a chip, or a chip system) configured in the terminal device.

Specifically, the communication apparatus 500 may correspondingly implement corresponding operations of the terminal device in the foregoing methods 300 to 401, and units or modules in the communication apparatus 500 may be configured to perform the methods performed by the terminal device in the methods 300 to 401. In addition, the units in the communication apparatus 500 and the foregoing other operations and/or functions are respectively used to implement corresponding procedures in the methods 300 to 401.

For example, when the communication apparatus corresponds to a corresponding operation of the terminal device in the implementation method 300, the sending unit 520 is configured to send first information to a first network side device by using a first user identity, where the first information may indicate first identification information corresponding to a second user identity. The first identification information may include an I-RNTI. Optionally, the first identification information may alternatively include an I-RNTI, an identifier of a physical cell to which the terminal device is connected by using the second user identity, and an identifier of a second network side device. Optionally, the first identification information may alternatively include an I-RNTI and a CGI.

Optionally, the sending unit 520 is further configured to send paging conflict indication information to the second network side device by using the first user identity, to indicate, to the second network side device, that a paging conflict may occur. It may be understood that the indication information is optional. In an optional solution, the sending unit 520 may send the first identification information, to implicitly indicate that there is a paging conflict.

Optionally, the sending unit 520 is further configured to send terminal monitoring indication information to the second network side device by using the first user identity, to indicate, to the second network side device, a user identity used by the terminal for monitoring.

It may be understood that the first information, the paging conflict indication information, and the monitoring indication information sent by the sending unit 520 may be sent via a same message. For example, the first information carries the paging conflict indication information and/or the monitoring indication information. Alternatively, the first information, the paging conflict indication information, and the monitoring indication information sent by the sending unit 520 may be sent via different messages. This is not limited in this embodiment of this application.

Optionally, the sending unit 520 is further configured to send second information to the second network side device by using the second user identity. Optionally, the second information may indicate second identification information corresponding to the first user identity. The second identification information may include a C-RNTI, an identifier of a physical cell to which the terminal device is connected by using the first user identity, and an identifier of the first network side device. Optionally, the second identification information may alternatively include a C-RNTI of the first user identity and a CGI of a serving cell.

Optionally, the sending unit 520 is further configured to send the paging conflict indication information to the second network side device by using the second user identity, to indicate, to the second network side device, that the paging conflict may occur. It may be understood that the indication information is optional. In an optional solution, the terminal device may send the second identification information, to implicitly indicate that there is the paging conflict.

Optionally, the sending unit 520 is further configured to send the terminal monitoring indication information to the second network side device by using the second user identity, to indicate, to the second network side device, the user identity used by the terminal for monitoring.

Optionally, the receiving unit 510 is configured to receive an RRC message from the first network side device. The communication apparatus 500 is in a connected state by using the first user identity and is in an inactive state by using the second user identity.

The processing unit 530 may implement a corresponding control or processing function, for example, is configured to learn, based on the RRC message, that the second network side device is to page the second user identity, and control implementation of a corresponding operation, so that the terminal device attempts to enter the connected state by using the second user identity. That is, after the second user identity of the terminal device is paged, the terminal device attempts to restore a connection to the network side device. If the connection is successfully restored, the terminal device may enter the connected state by using the second user identity.

Optionally, the receiving unit 510 is configured to receive a radio access network paging message from the first network side device. The communication apparatus 500 is in an idle state or an inactive state by using the first user identity and is in the inactive state by using the second user identity. The processing unit 530 may implement a corresponding control or processing function, for example, is configured to learn, based on the radio access network paging message, that the second network side device is to page the second user identity, and control implementation of a corresponding operation, so that the terminal device attempts to enter a connected state by using the second user identity.

When the communication apparatus corresponds to the terminal device in the method 301, the sending unit 520 is configured to send first information to a first network side device by using a first user identity. Optionally, the sending unit 520 is further configured to send second information to the first network side device by using a second user identity. The receiving unit 510 is configured to receive a paging message sent by the first network side device, where the paging message is used to indicate that the second user identity is to be paged. Optionally, the processing unit 530 may implement a corresponding control or processing function, for example, is configured to learn, based on the paging message, that the second network side device is to page the second user identity, and control implementation of a corresponding operation, so that the terminal device enters a connected state by using the second user identity.

When the communication apparatus corresponds to the terminal device in the method 400, the sending unit 520 is configured to send first information to a first core network device by using a first user identity. Optionally, the sending unit 520 is further configured to send paging conflict indication information to a second core network device by using a second user identity through an access network device. Optionally, the sending unit 520 is further configured to send terminal monitoring indication information to the first core network device by using the first user identity through the access network device. Optionally, the sending unit 520 is further configured to send second information to the second core network device by using the second user identity.

Optionally, the receiving unit 510 is configured to receive an RRC message from a first access network device, where the RRC message is used to indicate that the second user identity is to be paged, and the communication apparatus 500 is in a connected state by using the first user identity and is in an idle state by using the second user identity. Optionally, the processing unit 530 may implement a corresponding control or processing function, for example, is configured to learn, based on the RRC message, that the second network side device is to page the second user identity, and control implementation of a corresponding operation, so that the terminal device attempts to enter the connected state by using the second user identity.

Optionally, the receiving unit 510 is configured to receive a first paging message sent by a first access network device, where the first paging message is used to indicate that the second user identity is to be paged, and the communication apparatus 500 is in an idle state by using the first user identity and is in the idle state by using the second user identity. Optionally, the processing unit 530 may implement a corresponding control or processing function, for example, is configured to learn, based on the first paging message, that the second network side device is to page the second user identity, and control implementation of a corresponding operation, so that the terminal device attempts to enter a connected state by using the second user identity.

Optionally, the receiving unit 510 is configured to receive a second paging message sent by a first access network device, where the first paging message is used to indicate that the second user identity is to be paged, and the communication apparatus 500 is in an inactive state by using the first user identity and is in an idle state by using the second user identity. Optionally, the processing unit 530 may implement a corresponding control or processing function, for example, is configured to learn, based on the second paging message, that the second network side device is to page the second user identity, and control implementation of a corresponding operation, so that the terminal device attempts to enter a connected state by using the second user identity.

When the communication apparatus corresponds to the terminal device in the method 401, the sending unit 520 is configured to send first information to a first core network device by using a first user identity. Optionally, the sending unit 520 is further configured to send second information to a second core network device by using a second user identity. The receiving unit 510 is configured to receive a paging message sent by a first access network device, where the paging message is used to indicate that the second user identity is to be paged.

Optionally, the processing unit 530 may implement a corresponding control or processing function, for example, is configured to learn, based on the paging message, that the second network side device is to page the second user identity, and control implementation of a corresponding operation, so that the terminal device attempts to enter a connected state by using the second user identity.

In another possible design, the communication apparatus 500 may correspondingly implement corresponding operations of the first network side device in the foregoing method embodiments. For example, the communication apparatus 500 may be the first network side device, or may be a component (for example, a processor, a chip, or a chip system) configured in the first network side device.

Specifically, the communication apparatus 500 may correspondingly implement corresponding operations of the first network side device in the foregoing methods 300 to 401, and the communication apparatus 500 may include units configured to perform the methods performed by the first network side device in the methods 300 to 401. In addition, the units in the communication apparatus 500 and the foregoing other operations and/or functions are respectively used to implement corresponding procedures in the methods 300 to 401.

When the communication apparatus corresponds to the first network side device in the method 300, the receiving unit 510 is configured to receive first information from a terminal device. Optionally, the processing unit 530 is configured to complete association between a first user identity and a second user identity with a second network side device. Optionally, the processing unit 530 is further configured to determine, based on first identification information, that an anchor base station corresponding to the second user identity is the second network side device. Optionally, the sending unit 520 is configured to send the first identification information to the second network side device, to request the second network side device to complete the association between the first user identity and the second user identity. Optionally, the sending unit 520 is configured to send second identification information to the second network side device. Optionally, the receiving unit 510 is further configured to receive the second identification information sent by the second network side device. Optionally, the sending unit 520 is further configured to send association complete indication information to the second network side device. Optionally, the receiving unit 510 is further configured to receive paging indication information sent by the second network side device, where the paging indication information is used to indicate that the second user identity corresponding the terminal device is to be paged. Optionally, the sending unit 520 is configured to send connected-state indication information to the second network side device.

Optionally, the sending unit 520 is configured to send an RRC message to the terminal device, namely, the terminal device corresponding to the first user identity, where the terminal device is in a connected state by using the first user identity, and the terminal device is in an inactive state by using the second user identity.

Optionally, the sending unit 520 is configured to send a radio access network paging message to the terminal device, namely, the terminal device corresponding to the first user identity, where the terminal device is in a connected state by using the first user identity, and the terminal device is in an inactive state by using the second user identity.

When the communication apparatus corresponds to the first network side device in the method 301, the receiving unit 510 is configured to receive first information from a terminal device. Optionally, the receiving unit 510 is further configured to receive second information from the terminal device. Optionally, the processing unit 530 is further configured to: determine, based on first identification information, that an anchor base station corresponding to a second user identity is the first network side device, and learn that a first user identity and the second user identity belong to the same terminal device. Optionally, the processing unit 530 is further configured to: determine, based on second identification information, that the anchor base station corresponding to the second user identity is the first network side device, and learn that the first user identity and the second user identity belong to the same terminal device. Optionally, the sending unit 520 is further configured to send a paging message to the terminal device, namely, the terminal device corresponding to the first user identity. Optionally, the sending unit 520 is further configured to send related information (for example, an identifier of a network side device and an identifier of a user identity) to a third node. Optionally, the receiving unit 510 is further configured to receive association confirmation indication information from the third node, namely, information indicating that association between the first user identity and the second user identity is completed.

When the communication apparatus corresponds to the first network side device in the method 400, the first network side device is a first core network device. The receiving unit 510 is configured to receive first information. Optionally, the processing unit 530 is further configured to determine, based on the first information, that a first user identity and a second user identity correspond to a same terminal device. Optionally, the sending unit 520 is configured to send first identification information to a second network side device, to request the second network side device to complete association between the first user identity and the second user identity. Optionally, the receiving unit 510 is further configured to receive association confirmation indication information from the second network side device.

Optionally, the sending unit 520 is configured to send a first message to a first access network device, where the first message is used to indicate that the second user identity is to be paged.

Optionally, the processing unit 530) is configured to indicate the first access network device to send an RRC message to the terminal device, where the terminal device is in a connected state by using the first user identity, and the terminal device is in an idle state by using the second user identity.

Optionally, the processing unit 530) is configured to indicate the first access network device to send a first paging message to the terminal device, where the terminal device is in an idle state by using the first user identity, and the terminal device is in the idle state by using the second user identity.

Optionally, the processing unit 530) is configured to indicate the first access network device to send a second paging message to the terminal device, where the terminal device is in an inactive state by using the first user identity, and the terminal device is in an idle state by using the second user identity.

Optionally, the processing unit 530) is configured to indicate the first access network device to send a radio access network paging message to the terminal device, where the terminal device is in an inactive state by using the first user identity, and the terminal device is in an idle state by using the second user identity.

When the communication apparatus corresponds to the first network side device in the method 401, the receiving unit 510 is configured to receive first information. Optionally, the receiving unit 510 is further configured to receive second information. Optionally, the processing unit 530 is further configured to determine, based on the first information, that a first user identity and a second user identity correspond to a same terminal device. Optionally, the processing unit 530 is further configured to determine, based on the second information, that the first user identity and the second user identity correspond to the same terminal device. Optionally, the sending unit 520 is further configured to send a first message to a first access network device, where the first message is used to indicate that the second user identity is to be paged.

Optionally, the sending unit 520 is further configured to send related information (for example, an identifier of a core network device and an identifier of a user identity) to a fourth node, so that the fourth node associates the first user identity with the second user identity.

Optionally, the receiving unit 510 is further configured to receive paging information from the fourth node, and the processing unit 530 is further configured to learn, based on the paging information, that a second core network device needs to page the second user identity.

In still another possible design, the communication apparatus 500) may correspondingly implement corresponding operations of the second network side device in the foregoing method embodiments. For example, the communication apparatus 500 may be the second network side device, or may be a component (for example, a processor, a chip, or a chip system) configured in the second network side device.

Specifically, the communication apparatus 500 may correspondingly implement corresponding operations of the second network side device in the foregoing methods 300 and 400, and the communication apparatus 500 may include units configured to perform the methods performed by the second network side device in the methods 300 and 400. In addition, the units in the communication apparatus 500 and the foregoing other operations and/or functions are respectively used to implement corresponding procedures in the methods 300 and 400.

When the communication apparatus corresponds to the second network side device in the method 300, the receiving unit 510 is configured to receive second information from a terminal device. Optionally, the processing unit 530 is configured to determine, based on the second information, that both a first user identity and a second user identity correspond to a terminal device. Optionally, the receiving unit 510 is configured to receive paging conflict indication information from the terminal device. Optionally, the receiving unit 510 is configured to receive monitoring indication information from the terminal device. Optionally, the receiving unit 510 is configured to receive first identification information from a first network side device. The processing unit 530) is configured to learn, based on the first identification information, that related information may be sent through the first network side device. Further, it may be understood that the second network side device learns that the first user identity and the second user identity belong to the same terminal device. Optionally, the receiving unit 510 is configured to receive second identification information from the first network side device. Optionally, the sending unit 520 is configured to send association complete indication information to the first network side device. Optionally, the processing unit 530 is configured to determine, based on the received second identification information, that a base station corresponding to the first user identity is the first network side device. Optionally, the sending unit 520 is further configured to send the second identification information to the first network side device, to request the first network side device to complete the association between the first user identity and the second user identity. Optionally, the sending unit 520 is further configured to send the first identification information to the first network side device. Optionally, the receiving unit 510 is configured to receive the association complete indication information from the first network side device.

Optionally, the receiving unit 510 is configured to receive connected-state indication information from the first network side device. Optionally, the receiving unit 510 is configured to receive the paging conflict indication information. Optionally, the receiving unit 510 is configured to receive the monitoring indication information. Optionally, the sending unit 520 is further configured to send paging indication information to the first network side device, where the paging indication information is used to indicate that the second user identity corresponding the terminal device is to be paged.

When the communication apparatus corresponds to the second network side device in the method 400, the receiving unit 510 is configured to receive second information. Optionally, the receiving unit 510 is further configured to receive paging conflict indication information, and the processing unit 530 is configured to learn that there may be a paging conflict. Optionally, the receiving unit 510 is further configured to receive monitoring indication information. Optionally, the receiving unit 510 is further configured to receive first identification information from a first network side device. The processing unit 530 is further configured to learn, based on the first identification information, that related information may be sent through the first core network device. Further, it may be understood that a second core network device learns that a first user identity and a second user identity belong to a same terminal device. Optionally, the receiving unit 510 is further configured to receive second identification information from the first network side device. Optionally, the sending unit 520) is configured to send association complete indication information to the first network side device.

Optionally, the sending unit 520 is further configured to send the second identification information to the first network side device, to request the first network side device to complete association between the first user identity and the second user identity. Optionally, the sending unit 520 is further configured to send the first identification information to the first network side device. Optionally, the receiving unit 510 is configured to receive the association complete indication information from the first network side device.

Optionally, the receiving unit 510 is configured to receive connected-state indication information from the first network side device. Optionally, the receiving unit 510 is configured to receive the paging conflict indication information. Optionally, the receiving unit 510 is configured to receive the monitoring indication information. Optionally, the sending unit 520 is further configured to send paging indication information to the first network side device, where the paging indication information is used to indicate that the second user identity corresponding the terminal device is to be paged.

In a possible implementation, when the communication apparatus corresponds to the second network side device, the sending unit 520 is configured to send association-related information (for example, an identifier of a core network device and an identifier of a user identity) to a fourth node, so that the fourth node associates the first user identity with the second user identity. The sending unit 520 is configured to send the paging indication information to the fourth node, to indicate that the second user identity is to be paged.

In a possible design, corresponding to the foregoing possible implementations, the processing unit 530 may be a processor. Alternatively, the sending unit 520) and the receiving unit 510 may form a transceiver apparatus, for example, a transceiver apparatus 603 shown in FIG. 6. Alternatively, the sending unit 520) and the receiving unit 510 may form a communication interface. A storage unit 640 may be a memory, for example, a memory 602 shown in FIG. 6.

Based on a same technical concept, an embodiment of this application further provides a communication apparatus, configured to implement functions performed by the terminal device, the first network side device, or the second network side device in the foregoing method embodiments. FIG. 6 is a schematic block diagram of a possible communication apparatus 600 according to an embodiment of this application. The communication apparatus includes at least one processor 601 and a memory 602. Optionally, the communication apparatus may further include a transceiver apparatus 603 and a system bus 604. The bus 604 may be a PCI bus, an EISA bus, or the like. The bus may be classified into an address bus, a data bus, a control bus, or the like. For ease of indication, the bus is indicated by using only one bold line in FIG. 6. However, it does not indicate that there is only one bus or only one type of bus. The transceiver apparatus 603 is used by the communication apparatus 600 to perform communication interaction with another communication device (for example, a radio access network device or a terminal device, which is not limited herein), for example, exchange control signaling and/or service data. The transceiver apparatus 603 may be implemented by using a circuit having a communication transceiver function. The memory 602 is configured to store required program instructions and/or required data. When the at least one processor invokes and executes the program instructions stored in the memory, the communication apparatus is enabled to implement a function of the terminal device in any design of the methods 300 to 401. Alternatively, when the at least one processor invokes and executes the program instructions stored in the memory, the communication apparatus is enabled to implement a function of the network side device (the first network side device or the second network side device) in any design of the methods 300 to 401. The at least one processor 601, the memory 602, and the transceiver apparatus 603 are coupled through the system bus 604.

The processor and the transceiver apparatus described in embodiments of this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC process technologies, for example, a complementary metal oxide semiconductor (CMOS), an n-type metal oxide semiconductor (NMOS), a p-type metal oxide semiconductor (PMOS), a bipolar junction transistor (BJT), a bipolar CMOS (BiCMOS), silicon germanium (SiGe), and gallium arsenide (GaAs). Optionally, the processor may include one or more processors, for example, include one or more CPUs. When the processor is one CPU, the CPU may be a single-core CPU or a multi-core CPU. The transceiver apparatus is configured to: send and receive data and/or a signal, and receive data and/or a signal. The transceiver apparatus may include a transmitter and a receiver. The transmitter is configured to send data and/or a signal, and the receiver is configured to receive data and/or a signal. The transceiver may also be a communication interface. The memory includes but is not limited to a random access memory (RAM), a read-only memory (ROM), an erasable programmable read-only memory (EPROM), and a compact disc read-only memory (CD-ROM). The memory is configured to store related instructions and/or data.

An embodiment of this application further provides a computer-readable storage medium. The computer-readable storage medium stores computer instructions used to implement the method performed by the terminal device or the method performed by the network side device in the foregoing method embodiments.

For example, when the computer program is executed by a computer, the computer is enabled to implement the method performed by the terminal device or the method performed by the network side device in the foregoing method embodiments.

An embodiment of this application further provides a computer program product including instructions. When the instructions are executed by a computer, the computer is enabled to implement the method performed by the terminal device or the method performed by the network side device in the foregoing method embodiments.

An embodiment of this application further provides a communication system. The communication system includes the network device and the terminal device in the foregoing embodiments.

For explanations and beneficial effects of related content of any communication apparatus provided above, refer to the corresponding method embodiment provided above. Details are not described herein again.

All or some of the foregoing embodiments may be implemented by using software, hardware, firmware, or any combination thereof. When software is used to implement the foregoing embodiments, all or some of the embodiments may be implemented in a form of a computer program product. The computer program product includes one or more computer instructions. When the computer program instructions are loaded and executed on a computer, all or some of the procedures or the functions according to embodiments of the present application are generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. For example, the usable medium may include but is not limited to any medium that can store program code, such as a USB flash drive, a removable hard disk, a read-only memory (ROM), a random access memory (RAM), a magnetic disk, or an optical disc.

A person skilled in the art may understand that first, second, and various reference numerals in this application are for distinguishing only for ease of description, and are not used to limit the scope of embodiments of this application. A specific value of a numeral (which may also be referred to as an index), a specific value of a quantity, and a location in this application are merely used as an example, but are not unique representation forms, and are not used to limit the scope of embodiments of this application. First, second, and various reference numerals in this application are for distinguishing only for ease of description, and are not used to limit the scope of embodiments of this application.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural. The character "/" generally indicates an "or" relationship between the associated objects.

The term "at least one of" in this specification indicates all or any combination of listed items. For example, "at least one of A, B, and C" may indicate the following six cases: A exists alone, B exists alone, C exists alone, A and B coexist, B and C coexist, and A, B, and C coexist. A may be singular or plural. B may be singular or plural, and C may be singular or plural.

It may be understood that in embodiments of this application, "B corresponding to A" indicates that B is associated with A, and B may be determined based on A. However, it should be further understood that determining B based on A does not mean that B is determined based on only A. B may alternatively be determined based on A and/or other information.

For same or similar parts in embodiments of this application, refer to each other. In embodiments of this application and the implementations/implementation methods/implementation methods in embodiments, unless otherwise specified or a logical conflict occurs, terms and/or descriptions are consistent and may be mutually referenced between different embodiments and between the implementations/implementation methods/implementation methods in embodiments. Technical features in the different embodiments and the implementations/implementation methods/implementation methods in embodiments may be combined to form a new embodiment, implementation, implementation method, or implementation method according to an internal logical relationship thereof. The foregoing descriptions are implementations of this application, but are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application may fall within the protection scope of this application.

What is claimed is:

1. A communication method, comprising:
    sending, by a terminal device to a network side device, information indicating that a first user identity of the terminal device and a second user identity of the terminal device are associated with the terminal device; and
    receiving, by the terminal device using the first user identity of the terminal device, paging information corresponding to the second user identity of the terminal device;
    wherein sending the information comprises: sending first information to a first network side device, wherein the first information comprises identification information of the terminal device corresponding to the second user identity, wherein the first network side device provides a service for the first user identity of the terminal device, and a second network side device provides a service for the second user identity of the terminal device;
    wherein receiving the paging information comprises:
        receiving a radio resource control (RRC) message, wherein the RRC message is a message sent to the first user identity of the terminal device, wherein the RRC message comprises the paging information, wherein the terminal device using the first user identity corresponds to the terminal device being in a connected state, and wherein the terminal device using the second user identity corresponds to the terminal device being in an idle state or an inactive state; or receiving a paging message, wherein the paging message is sent to the first user identity of the terminal device, wherein the paging message comprises the paging information, wherein the terminal device using the first user identity corresponds to the terminal device being in the idle state or the inactive state, and wherein the terminal device using the second user identity corresponds to the terminal device being in the idle state or the inactive state.

2. The method according to claim 1, wherein sending the information further comprises:
sending second information to the second network side device, wherein the second information comprises identification information of the terminal device corresponding to the first user identity.

3. The method according to claim 1, wherein receiving the paging information comprises:
receiving the RRC message, wherein the RRC message is a message sent to the first user identity of the terminal device, wherein the RRC message comprises the paging information, wherein the terminal device using the first user identity corresponds to the terminal device being in a connected state, and wherein the terminal device using the second user identity corresponds to the terminal device being in the idle state or the inactive state.

4. The method according to claim 1, wherein receiving the paging information comprises:
receiving the paging message, wherein the paging message is sent to the first user identity of the terminal device, wherein the paging message comprises the paging information, wherein the terminal device using the first user identity corresponds to the terminal device being in the idle state or the inactive state, and wherein the terminal device using the second user identity corresponds to the terminal device being in the idle state or the inactive state.

5. The method according to claim 4, further comprising:
sending monitoring indication information to the second network side device, wherein the monitoring indication information indicates that the terminal device is to receive the paging information in a cell corresponding to the first user identity.

6. The method according to claim 1, wherein the paging information comprises:
an identifier of the terminal device corresponding to the second user identity.

7. The method according to claim 1, further comprising:
attempting, by the terminal device, to enter a connected state by using the second user identity.

8. A communication method, comprising:
receiving, by a first network side device, information indicating that a first user identity of a terminal device and a second user identity of the terminal device are associated with the terminal device, wherein the first network side device provides a service for the first user identity of the terminal device;
sending, by the first network side device to a second network side device, the information indicating that the first user identity of the terminal device and the second user identity of the terminal device are associated with the terminal device, wherein the second network side device provides a service for the second user identity of the terminal device;
receiving, by the first network side device, paging indication information from the second network side device, wherein the paging indication information indicates that the second user identity of the terminal device is to be paged; and
sending, by the first network side device, a first message to indicate that the second user identity of the terminal device is to be paged.

9. The method according to claim 8, wherein receiving the information indicating that the first user identity of the terminal device and the second user identity of the terminal device are associated with the terminal device comprises:
receiving first information, wherein the first information comprises identification information of the terminal device corresponding to the second user identity.

10. The method according to claim 8, further comprising:
receiving, by the first network side device from the second network side device, information indicating that association between the first user identity and the second user identity has been completed.

11. The method according to claim 8, wherein both the first network side device and the second network side device are core network nodes, and wherein sending the first message comprises:
sending, by the first network side device, the first message to a first access network device to indicate that the first access network device is to send a radio resource control (RRC) message to the terminal device, wherein the RRC message is a message to be sent to the first user identity of the terminal device, wherein the RRC message indicates that the second user identity of the terminal device is to be paged, wherein the terminal device using the first user identity corresponds to the terminal device being in a connected state, and wherein the terminal device using the second user identity corresponds to the terminal device being in an idle state.

12. The method according to claim 8, wherein both the first network side device and the second network side device are core network nodes, and wherein sending the first message comprises:
sending, by the first network side device, the first message to a first access network device to indicate that the first access network device is to send a first paging message to the terminal device, wherein the first paging message is a message to be sent to the first user identity of the terminal device, wherein the first paging message indicates that the second user identity of the terminal device is to be paged, wherein the terminal device using the first user identity corresponds to the terminal device being in an idle state, and wherein the terminal device using the second user identity corresponds to the terminal device being in the idle state or an inactive state.

13. The method according to claim 8, wherein both the first network side device and the second network side device are access network devices, and wherein sending the first message comprises:
sending, by the first network side device, a radio resource control (RRC) message to the terminal device, wherein the RRC message is a message sent to the first user identity of the terminal device, wherein the RRC message indicates that the second user identity of the terminal device is to be paged, wherein the terminal device using the first user identity corresponds to the terminal device being in a connected state, and wherein the terminal device using the second user identity corresponds to the terminal device being in an inactive state.

14. The method according to claim 8, wherein both the first network side device and the second network side device are access network devices, and wherein sending the first message comprises:
  sending, by the first network side device, a radio access network paging message to the terminal device, wherein the radio access network paging message is a message sent to the first user identity of the terminal device, wherein the radio access network paging message indicates that the second user identity of the terminal device is to be paged, wherein the terminal device using the first user identity corresponds to the terminal device being in an inactive state, and wherein the terminal device using the second user identity corresponds to the terminal device being in the inactive state or an idle state.

15. The method according to claim 11, further comprising:
  sending, by the first network side device, connected-state indication information to the second network side device, wherein the connected-state indication information indicates that the terminal device is in the connected state using the first user identity.

16. A communication method, comprising:
  determining, by a second network side device, that a first user identity of a terminal device is associated with a second user identity of the terminal device;
  determining, by the second network side device, to page the second user identity of the terminal device through a first network side device, wherein the first network side device provides a service for the first user identity of the terminal device, and the second network side device provides a service for the second user identity of the terminal device; and
  sending, by the second network side device, paging indication information to the first network side device, wherein the paging indication information indicates that the second user identity is to be paged;
  wherein determining that the first user identity is associated with the second user identity comprises: receiving second information, wherein the second information comprises identification information of the terminal device corresponding to the first user identity.

17. The method according to claim 16, wherein determining that the first user identity is associated with the second user identity further comprises:
  receiving, by the second network side device from the first network side device, information indicating that the first user identity of the terminal device and the second user identity of the terminal device are associated with the terminal device.

18. The method according to claim 17, further comprising:
  sending, by the second network side device to the first network side device, information indicating that association between the first user identity and the second user identity has been completed.

* * * * *